(12) United States Patent
Inoue et al.

(10) Patent No.: US 10,163,266 B2
(45) Date of Patent: Dec. 25, 2018

(54) TERMINAL CONTROL METHOD, IMAGE GENERATING METHOD, AND TERMINAL

(71) Applicant: FUJITSU LIMITED, Kawasaki-shi, Kanagawa (JP)

(72) Inventors: Yuta Inoue, Adachi (JP); Kazuhisa Kawasima, Shizuoka (JP); Toshiyuki Ito, Kawasaki (JP); Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 15/195,435

(22) Filed: Jun. 28, 2016

(65) Prior Publication Data

US 2017/0004382 A1  Jan. 5, 2017

(30) Foreign Application Priority Data

Jul. 2, 2015  (JP) ................ 2015-133643

(51) Int. Cl.
| | |
|---|---|
| *G06K 9/80* | (2006.01) |
| *G06T 19/00* | (2011.01) |
| *G06T 7/73* | (2017.01) |
| *G06K 9/00* | (2006.01) |

(52) U.S. Cl.
CPC ........ *G06T 19/006* (2013.01); *G06K 9/00671* (2013.01); *G06T 7/74* (2017.01); *G06T 2207/30208* (2013.01)

(58) Field of Classification Search
CPC .............. G06T 19/006; G06K 9/00671; G06F 3/011–3/014
See application file for complete search history.

(56) References Cited

U.S. PATENT DOCUMENTS

| | | | |
|---|---|---|---|
| 9,846,966 B2 * | 12/2017 | Sadasue | G06T 19/006 |
| 2014/0009494 A1 * | 1/2014 | Kasahara | G06K 9/00671 |
| | | | 345/633 |

FOREIGN PATENT DOCUMENTS

JP  2012-215989 A  11/2012

OTHER PUBLICATIONS

Gausemeier et al., "Development of a Real Time Image Based Object Recognition Method for Mobile AR-Devices", Copyright 2003 by the Association for Computing Machinery, Inc. (ACM), pp. 133-140. (Year: 2003).*

* cited by examiner

*Primary Examiner* — Brian Werner
(74) *Attorney, Agent, or Firm* — Westerman, Hattori, Daniels & Adrian, LLP

(57) ABSTRACT

A terminal control method executed by a computer, includes detecting that an image of a reference object is included in a captured image; and sending identification information that identifies the reference object or content associated with the reference object, position information that indicates a position of the reference object or the content in the captured image, and the captured image to an information processing apparatus that is configured to combine a content associated with received identification information, with a received captured image, based on received position information.

8 Claims, 17 Drawing Sheets

FIG.6
| AR MARKER ID | AR MARKER PATTERN |
|---|---|
| ARID 1 | 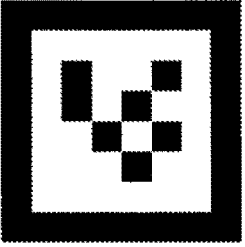 |
| ARID 2 |  |
| ARID 3 |  |
| ... | ... |

FIG. 7
| AR CONTENT ID | AR CONTENT | AR MARKER ID | RELATIVE COORDINATES FROM AR MARKER |
|---|---|---|---|
| OBJID 1 | 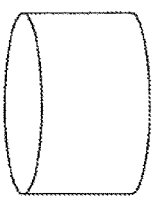 | ARID 1 | $M_1$ |
| OBJID 2 | CAUTION! | ARID 1 | $M_2$ |
| OBJID 3 | TURN TO RIGHT  | ARID 2 | $M_3$ |
| OBJID 4 |  | ARID 3 | $M_4$ |
| ... | ... | ... | ... |

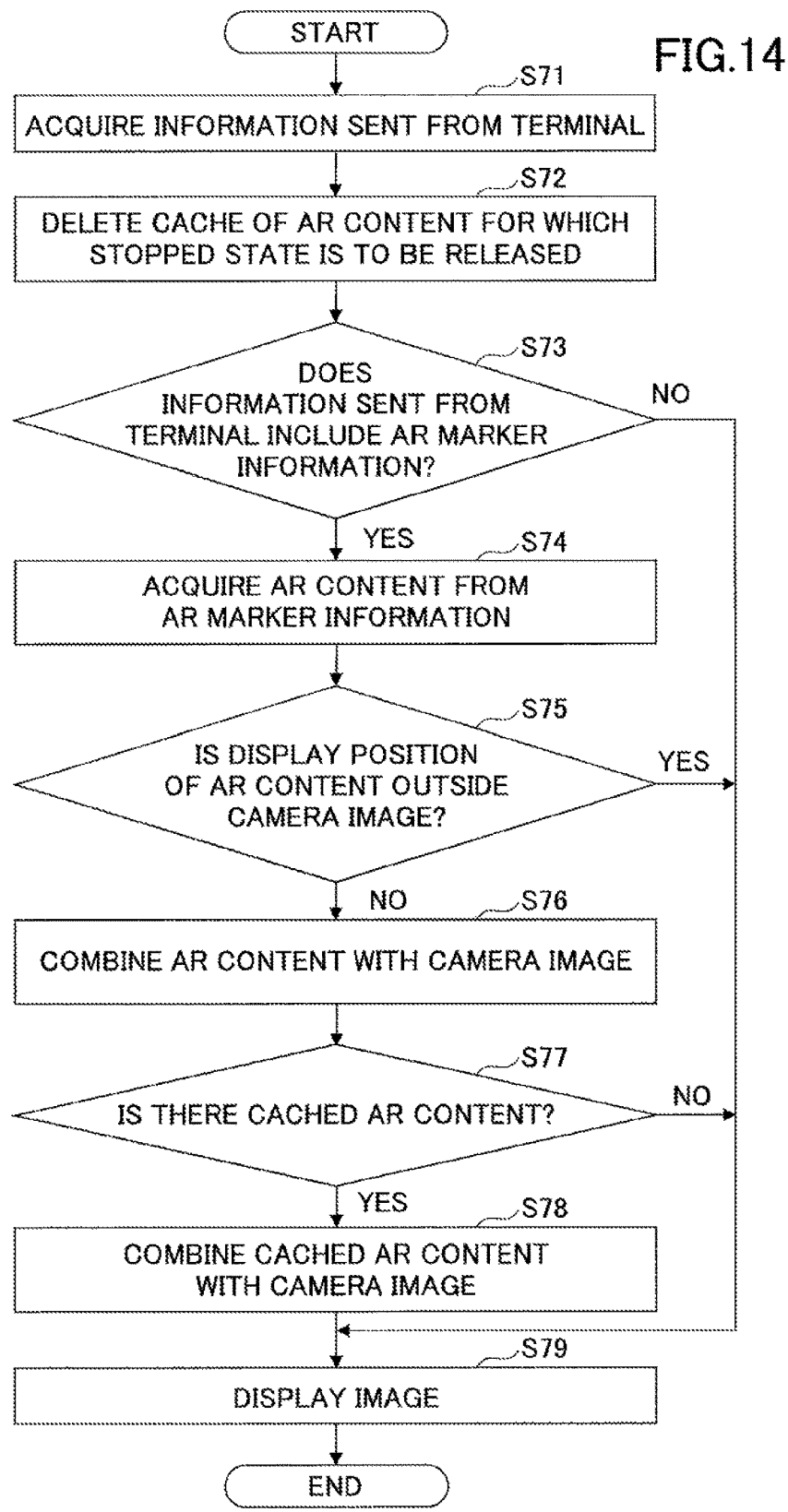

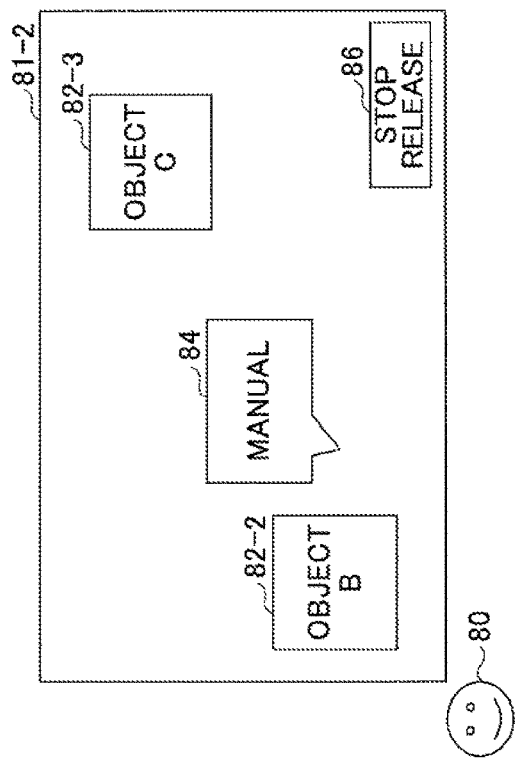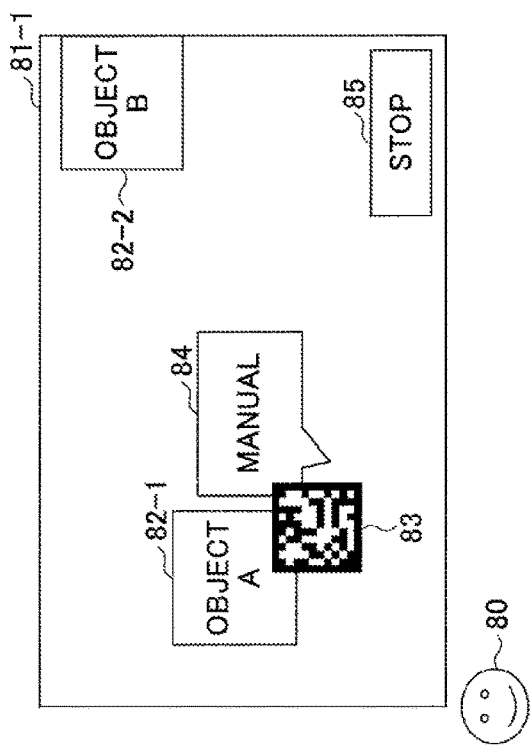

TERMINAL CONTROL METHOD, IMAGE GENERATING METHOD, AND TERMINAL

CROSS-REFERENCE TO RELATED APPLICATION

This patent application is based upon and claims the benefit of priority of the prior Japanese Patent Application No. 2015-133643 filed on Jul. 2, 2015, the entire contents of which are incorporated herein by reference.

FIELD

The embodiments discussed herein are related to a terminal control method, an image generating method, and a terminal.

BACKGROUND

There is known the Augmented Reality (AR) technology of displaying and superimposing content such as an image, etc., on a part of an image captured by an imaging unit such as a camera. In the AR technology, image data (hereinafter, referred to as "AR content" according to need) is arranged by being displayed and superimposed on an augmented space, based on position information and identification information (marker ID) with respect to an AR marker (reference object) recognized in a captured image.

For example, in conventional AR display, when an image of an AR marker is detected, which is included in an image photographed by a terminal, the marker ID corresponding to the detected AR marker is acquired, and AR content associated with the acquired marker ID is acquired. Next, the positional relationship between the AR marker and the camera is estimated based on the size and the shape (distortion) of the marker area of the AR marker, the arrangement (position, direction, etc.) of the AR content is determined by using the estimated positional relationship, and the AR content is displayed and superimposed on the image according to the determined arrangement.

For example, there is a remote support system using the AR technology. Specifically, in the remote support system, AR content is combined with an image captured with a terminal by a worker, etc., at a site, the composite image is sent to a server used by a remote supporter via a communication network, and the worker performs the work by receiving instructions from the remote supporter while sharing the image with the remote supporter.

Furthermore, the above-described AR technology is also applied to a wearable computer, such as a head mounted display (hereinafter, also referred to as "HMD"), an eyeglasses type display, etc. In the HMD, etc., it is possible to display the AR content corresponding to a real object, etc., in the field of view of the user, by displaying the AR content on a transmissive screen that the user is wearing at the position of the user's eyes.

Patent Document 1: Japanese Laid-Open Patent Publication No. 2012-215989

SUMMARY

According to an aspect of the embodiments, a terminal control method executed by a computer, includes detecting that an image of a reference object is included in a captured image; and sending identification information that identifies the reference object or content associated with the reference object, position information that indicates a position of the reference object or the content in the captured image, and the captured image to an information processing apparatus that is configured to combine a content associated with received identification information, with a received captured image, based on received position information.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 6 illustrates an example of an AR marker DB;

FIG. 7 illustrates an example of an AR content DB;

FIG. 14 is a flowchart of an example of a screen generating process by the server according to the third embodiment;

FIGS. 15A and 15B illustrate the stopped state and the stop released state of the AR content, respectively;

DESCRIPTION OF EMBODIMENTS

In a remote support system, etc., using the AR technology, a terminal performs the process of combining a captured image with AR content, and sending the composite image to an external remote supporter, and therefore processing load is applied to the terminal. Accordingly, the screen is not smoothly shared with the remote supporter, etc.

Preferred embodiments of the present invention will be explained with reference to accompanying drawings.

<Example of Schematic Configuration of Information Processing System>

Figure 1:
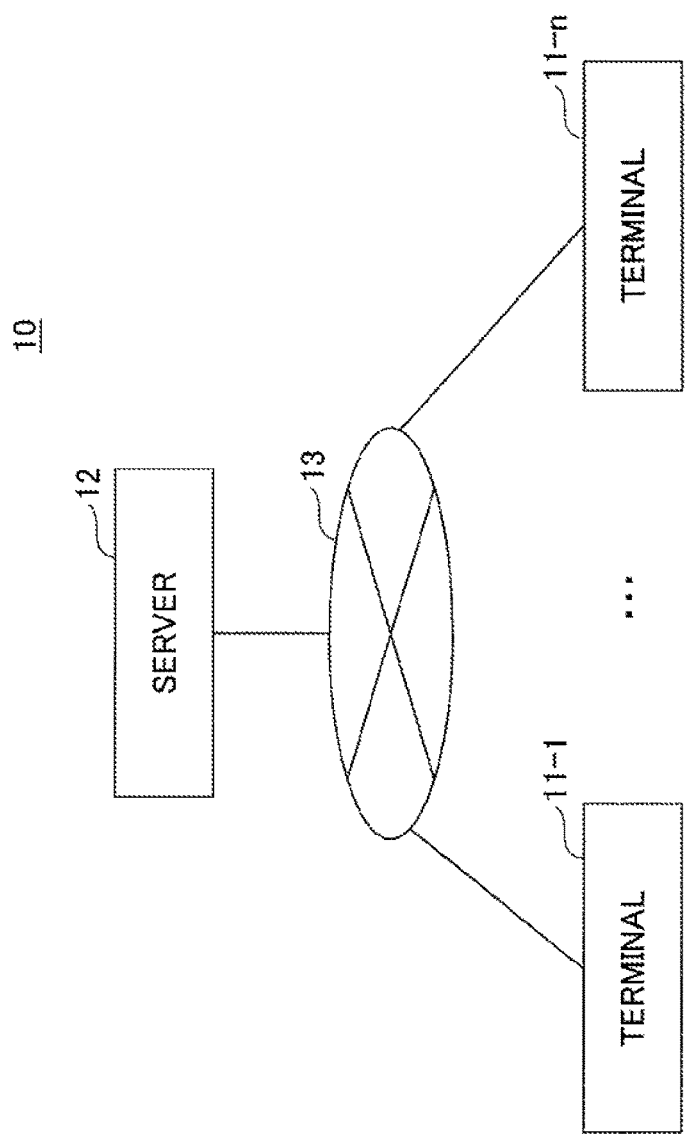
FIG. 1 illustrates an example of a schematic configuration of an information processing system.

FIG. 1 illustrates an example of a schematic configuration of an information processing system. An information processing system 10 illustrated in FIG. 1 includes one or more terminals 11-1 through 11-*n* (hereinafter, collectively referred to as a "terminal 11" according to need), and a server 12 as an example of an information processing apparatus. The terminal 11 and the server 12 are communicatively connected such that data is sent and received with each other via a communication network 13, for example.

For example, the terminal 11 is a terminal used by a worker, etc., in a remote support system, etc. The terminal 11 captures an image with an imaging unit such as a built-in camera, etc. When the terminal 11 detects that an image of an AR marker, which is an example of a reference object, is included in the captured image (camera image), the terminal 11 registers the AR content (content) corresponding to the AR marker (authoring process). The authoring process is a process of registering one or more AR contents corresponding to the identification information (for example, marker ID) associated with the AR marker, and the relative position information based on the marker position of the AR content; however, the authoring process is not so limited.

Here, the AR marker is, for example, a signage for specifying the content of various kinds of content information such as AR content, etc., the position where the AR content is to be displayed, etc. The AR marker is, for example, an image, etc., in which a predetermined pattern, a character pattern, etc., is formed in a predetermined area, such as a two-dimensional code; however, the AR marker is not so limited.

Furthermore, the standard object is not limited to an AR marker. For example, the standard object may be, for example, a particular object from which a predetermined feature amount may be extracted by, for example, edge extraction, obtained from the difference between the reference object and surrounding pixels. The particular object may be, for example, a clock, a machine, a window, a painting, a figurine, a personal computer (PC), a pillar, a pipe, etc. For example, by storing feature amount data (for example, an object recognition-use dictionary, etc.) with respect to each object in advance, and performing matching by using the feature amount of each object obtained from image data, it is possible to acquire identification information corresponding to the object, and to set the AR content in association with the identification information.

AR content is, for example, model data, etc., of a three-dimensional object arranged in a three-dimensional virtual space corresponding to a real space. The AR content is, for example, superimposition information that is displayed and superimposed on an image photographed by the terminal 11, or information that is combined with the captured image at the server 12. Furthermore, the AR content is displayed, for example, at a position set by relative coordinates from the AR marker included in the captured image. The AR content according to the present embodiment is, for example, associated with an AR marker, etc., and includes various modes such as text, an icon, animation, a mark, a pattern, an image, a video, etc. Furthermore, the AR content is not limited to being displayed and output; for example, the AR content may be information such as voice sound, etc.

Furthermore, when the terminal 11 detects that a reference object (AR marker) is included in a captured image, the terminal 11 sends identification information of a reference object and position information of the reference object in the captured image, to the server 12, which combines AR content that is stored (registered) in association with the identification information, with the captured image, based on the position information. Furthermore, the terminal 11 acquires the AR content associated with the AR marker, and displays the acquired AR content on a screen.

Furthermore, when the terminal 11 detects that an image of a reference object (AR marker) is included in a captured image, the terminal 11 detects the identification information of the AR content stored in association with the reference object, and sends the identification information of the detected AR content and the position information of the AR content in the image, to the server 12.

Furthermore, when the terminal 11 receives, from the user, an operation of fixing (stopping) the position of displaying the content in the display screen displaying the captured image, the terminal 11 sends information indicating that the operation has been received, to the server 12. Furthermore, the terminal 11 is able to receive an instruction from the remote supporter, display the received information on the screen, and output a voice sound.

The terminal 11 is, for example, a tablet terminal, a smartphone, a Personal Digital Assistant (PDA), a notebook PC, etc.; however, the terminal 11 is not so limited, for example, the terminal 11 may be a communication terminal such as a game console, a mobile phone, etc.

Furthermore, as an example of the terminal 11, a transmissive display device such as HMD, an eyeglasses type display, etc., may be used. The head mounted display and the eyeglasses type display are wearable devices including a transmissive screen (display unit) at the position (along the field of view) corresponding to the eyes of the user. The terminal 11 is able to display the above AR content within a field of view range that the user is actually viewing, by displaying the above AR content in a transmissive manner on a transmissive screen (display unit). Note that the AR content may be displayed as a transmissive display object, and may be subjected to display control by a display control unit, etc.

Furthermore, when the terminal 11 is a head mounted display, an eyeglasses type display, etc., among the configurations of terminal 11, the configurations relevant to the display unit, etc., and other configurations, may be separately provided, and a configuration similar to the terminal 11 described above may be realized by connecting these separate configurations.

The server 12 is, for example, a terminal used by a remote supporter in a report support system; however, the server 12 is not so limited, for example, the server 12 may be a terminal that the remote supporter accesses from another terminal via the communication network 13.

The server 12 acquires AR content associated with an AR marker, based on the captured image, and the identification information and the position information of the AR marker, sent from the terminal 11, combines the captured image with the AR content, and displays the composite image. Furthermore, when the server 12 acquires the captured image and the identification information and the position information of the AR marker from the terminal 11, the server 12 acquires the AR content corresponding to the identification information of the AR content, and outputs the AR content in a predetermined position of the captured image based on the position information.

Furthermore, for example, when the identification information and the position information of the AR marker are not sent from the terminal 11, or when the identification information and the position information have been sent but the AR content is positioned in the camera image, the server 12 does not perform the combination process.

Furthermore, when a stop operation of fixing (stopping) the AR content in the screen is performed at the terminal 11, the server 12 combines the AR content immediately before the stop operation with a captured image acquired after the stop operation.

Furthermore, the server 12 may send instruction information from a remote supporter, etc., to the terminal 11 via the communication network 13. The server 12 may be, for example, a PC, etc.; however, the server 12 is not so limited, for example, the server 12 may be a cloud server, etc., constituted by cloud computing including one or more information processing apparatuses.

The communication network 13 is, for example, the Internet, a Local Area Network (LAN), etc.; however, the communication network 13 is not so limited. Furthermore, the communication network 13 may wired or wireless, or a combination of wired and wireless networks.

In configuration of the information processing system 10 illustrated in FIG. 1, the relationship between the terminals 11 and the server 12 is n to one; however, the configuration is not so limited, for example, a plurality of servers may be included.

<Example of Functional Configuration of Terminal 11>

Figure 2:
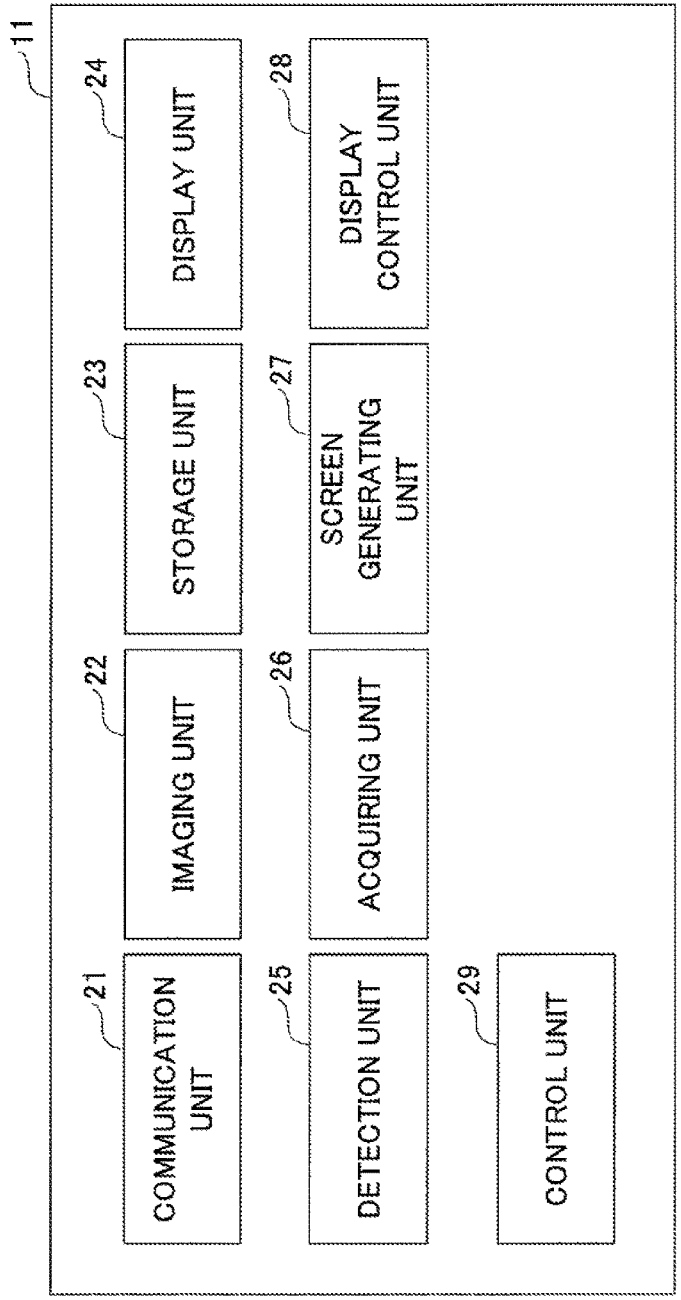
FIG. 2 illustrates an example of a functional configuration of a terminal.

Next, a description is given of an example of a functional configuration of the terminal 11 described above, with reference to a drawing. FIG. 2 illustrates an example of a functional configuration of the terminal 11. The terminal 11 includes a communication unit 21, an imaging unit 22 (image acquiring unit), a storage unit 23, a display unit 24, a detection unit 25, an acquiring unit 26, a screen generating unit 27, a display control unit 28, and a control unit 29.

The communication unit 21 performs transmission and reception of data with the server 12 and other computers, etc., via the communication network 13. For example, the communication unit 21 performs an authoring process of sending, to the server 12, etc., the AR content associated with the AR marker, the relative position information corresponding to the AR marker, etc., and registering (storing) these information items in the server 12, etc. Furthermore, when an AR marker is included in an image captured by the imaging unit 22, the communication unit 21 sends the identification information of the reference object corresponding to the AR marker, the position information of the AR marker in the captured image (for example, the center coordinates of the AR marker), and the captured image, to the server 12. Furthermore, the communication unit 21 receives instruction information etc., from a remote supporter obtained from the server 12.

The imaging unit 22 captures images at predetermined frame intervals, and generates image data. The imaging unit 22 is, for example, a digital camera, etc.; however, the imaging unit 22 is not so limited. Furthermore, the imaging unit 22 may be built in the terminal 11, or may be an external device that may be connected to the terminal 11. When the user wears the imaging unit 22, the orientation information such as the tilt, the direction, etc., is preferably integrally operated with the terminal 11; however, the imaging unit 22 is not so limited. Furthermore, the imaging unit 22 may acquire the image data captured by an external imaging device, etc. In this case, the image data preferably includes the position information and the orientation information of the imaging device; however, the image data is not so limited. The imaging unit 22 captures images at frame intervals that have been set in advance. The imaging unit 22 outputs the captured image (camera image) to the control unit 29, or stores the captured image in the storage unit 23.

The storage unit 23 stores various kinds of information needed in the present embodiment. The storage unit 23 stores, for example, an AR marker database (hereinafter, "DB") for managing the AR content information, AR content DB, various other kinds of setting information, etc.; however, the stored contents are not so limited. Furthermore, the storage unit 23 may store and manage AR marker IDs of AR contents to be fixed (stopped) in the screen, as a list of stopped AR marker IDs.

Furthermore, the respective information items described above may be information that is acquired from the server 12, etc., or information that is set by the user with the terminal 11. Furthermore, the storage unit 23 is able to write and read information according to control by, for example, the control unit 29.

The display unit 24 displays the captured image acquired from the imaging unit 22, and displays a superimposition image in which AR content is superimposed on the captured image. Furthermore, the display unit 24 displays a menu screen and a setting screen set in advance for performing a terminal control process according to the present embodiment, and displays an operation screen for operating the terminal 11, etc. Furthermore, the display unit 24 may be used for inputting information from the screen, like a touch panel, etc.

The detection unit 25 detects whether an image of an AR marker is included in the acquired image. For example, the detection unit 25 performs image recognition with respect to a captured image obtained by the imaging unit 22, matches the AR markers against an AR marker pattern in the AR marker DB stored in the storage unit 23 in advance to detect an AR marker that matches the AR market pattern or that has a high similarity with respect to the AR market pattern, and detects the identification information (AR marker ID) of the detected AR marker.

In the present embodiment, for example, by applying an AR marker to an object (target) in a real space included in a captured image, it is possible to display and superimpose, on the captured image, the method of using the object, the work procedures, precautions, etc., with respect to the object, as AR content associated with the identification information of the AR marker.

Note that a reference object according to the present embodiment is not limited to an AR marker. For example, as described above, an object that is registered in advance may be used as the reference object. In this case, the detection unit 25 may recognize the registered object in the captured image, and acquire identification information corresponding to the recognized object. For example, the detection unit 25 uses an object (target) in a real space as the reference object instead of an AR marker, performs matching, and acquires identification information (for example, a marker ID) with respect to the AR marker. Furthermore, the detection unit 25 acquires position coordinates (x, y) in an image in which an AR marker is identified.

Furthermore, the detection unit 25 synchronizes the detected AR marker information (the AR marker ID and position information (coordinates) of the AR marker in the image), with the captured image captured by the imaging unit 22, and this information is sent to the server 12 from the communication unit 21.

The acquiring unit 26 acquires AR content corresponding to the AR marker ID detected by the detection unit 25. For example, the acquiring unit 26 refers to AR content DB stored in the storage unit 23, and acquires the AR content corresponding to the AR marker ID and the relative coordinates (x, y, z) from the AR market position. The relative coordinates are at least one of, for example, "coordinate values", "rotation angle", "magnification/reduction ratio", etc. The "coordinate values" are two-dimensional or three dimensional position information of the position where the AR content is to be displayed. The "coordinate values" may be set based on, for example, the position information, the orientation information, etc., of the terminal 11.

The "rotation angle" is information indicating how much the AR content is tilted in the three-dimensional direction from a basic angle set in advance with respect to the corresponding AR content. The "magnification/reduction ratio" is information indicating how much the AR content is magnified or reduced in the three-dimensional direction with reference to a size that is set in advance with respect to the corresponding AR content. In the present embodiment, at least one of "coordinate values", "rotation angle", and "magnification/reduction ratio" may be used as the position information of the AR content.

Furthermore, in the present embodiment, instead of sending the AR marker ID from the detection unit 25, the acquiring unit 26 may refer to the AR content DB, refer to the AR content corresponding to the AR marker ID, and acquire the identification information (AR content ID) of the obtained AR content. Furthermore, the acquiring unit 26 may synchronize the acquired AR content information (the AR content ID and position information (coordinates) of the AR content in the image), with the captured image, and this information may be sent to the server 12 from the communication unit 21.

The screen generating unit 27 generates a superimposition image by superimposing the AR content at a position corresponding to the relative coordinates with reference to the position of the AR marker (for example, the center coordinates of the AR marker) in the captured image. The screen generating unit 27 displays the generated image on the screen of the display unit 24. For example, the screen generating unit 27 may display the AR content on the screen at a relative position from the AR marker; however, the position is not so limited.

Furthermore, for example, the screen generating unit 27 determines whether display position of the AR content is outside the captured image (camera image). When the display position of the AR content is outside the captured image, the screen generating unit 27 does not display and superimpose the AR content, and only the captured image is displayed by the display unit 24. Furthermore, the screen generating unit 27 may generate and display a button for fixing (stopping) the present display position of the AR content in the display screen, a button for releasing the fixed display position, etc., Furthermore, the screen generating unit 27 may display a setting screen for performing the terminal control process according to the present embodiment, and generate a screen for performing the authoring process such as registering the AR content, etc.

The display control unit 28 controls whether to fix the display of at least one of the one or more AR contents displayed together with the captured image on the display unit 24. Furthermore, the display control unit 28 releases the fixed display of the AR content that is fixedly displayed. The information that is controlled by the display control unit 28 is output to the screen generating unit 27, and the screen generating unit 27 generates a corresponding image.

The control unit 29 controls the overall processes by the units included in the terminal 11. The control unit 29 performs processes such as taking images by the imaging unit 22, detecting an AR marker included in the captured image (acquired image) by the detection unit 25, acquiring AR content corresponding to an AR marker ID by the acquiring unit 26, generating a superimposition display screen by the screen generating unit 27, and implementing display control on the AR content by the display control unit 28. Note that the process contents at the control unit 29 are not limited to the above; for example, the control unit 29 may perform a process when the terminal control process according to the present embodiment starts and ends, when an error occurs, etc.

<Example of Hardware Configuration of Terminal 11>

Figure 3:
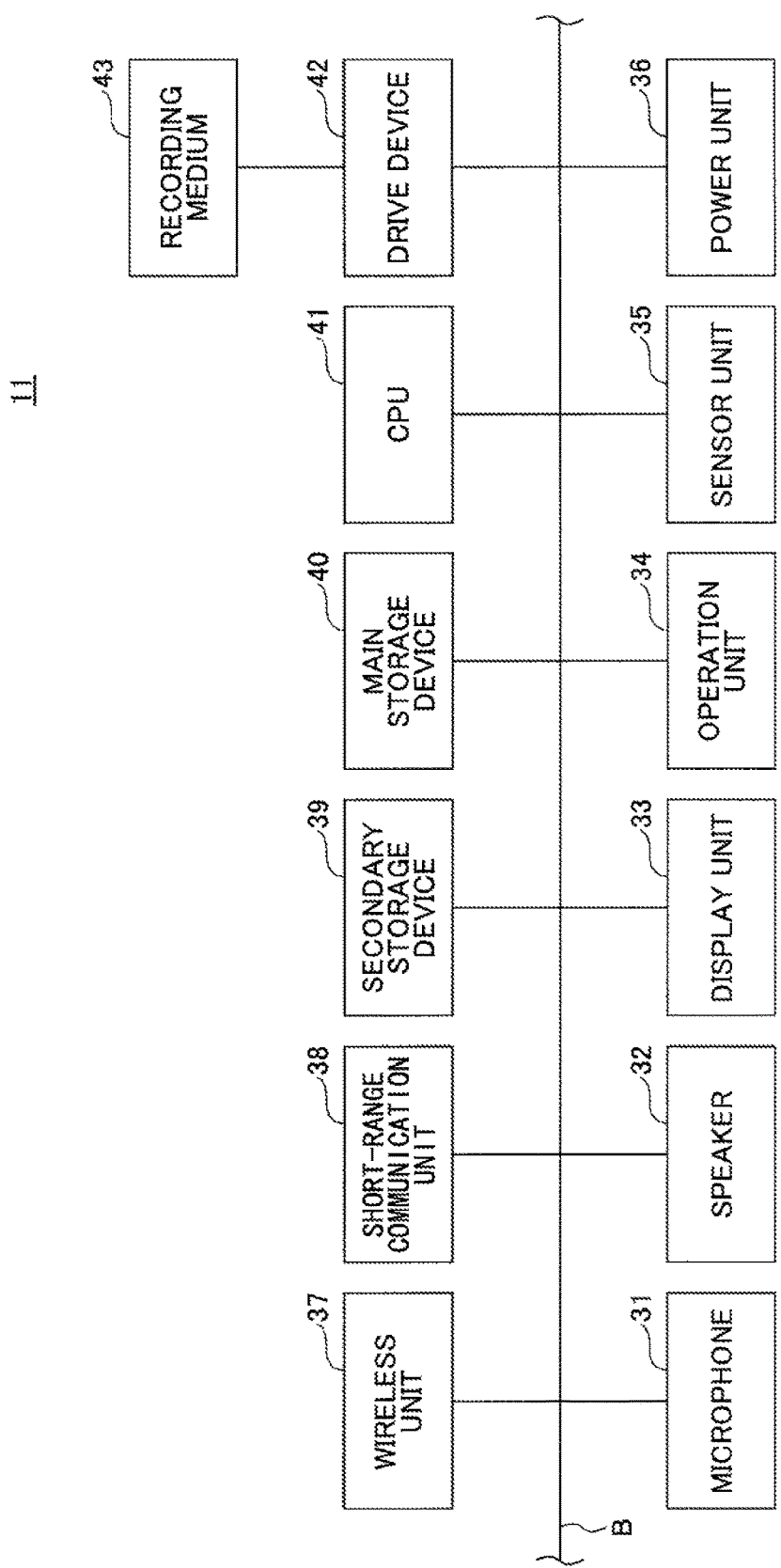
FIG. 3 illustrates an example of a hardware configuration of the terminal.

Next, a description is given of an example of a hardware configuration of the terminal 11, with reference to a drawing. FIG. 3 illustrates an example of a hardware configuration of the terminal 11. In the example of FIG. 3, the terminal 11 includes a microphone 31, a speaker 32, a display unit 33, an operation unit 34, a sensor unit 35, a power unit 36, a wireless unit 37, a short-range communication unit 38, a secondary storage device 39, a main storage device 40, a Central Processing Unit (CPU) 41, and a drive device 42, which are interconnected via a system bus B.

The microphone 31 inputs a voice sound emitted by the user and other sounds. The speaker 32 outputs the voice sound of the communication partner, and outputs sound such as a ringtone, etc. The microphone 31 and the speaker 32 may be used, for example, when speaking with a communication partner when a telephone function is used, etc.; however, the microphone 31 and the speaker 32 are not so limited, and may be used for inputting and outputting information according to voice sound.

The display unit 33 displays a screen set by the OS or various applications, for the user. Furthermore, the display unit 33 may be a touch panel display, etc., in which case the display unit 33 has a function of an input output unit.

The display unit 33 is, for example, a display such as a Liquid Crystal Display (LCD), an organic Electro Luminescence (EL) display, etc.

The operation unit 34 includes operation buttons displayed on the screen of the display unit 33, operation buttons provided on the outside of the terminal 11, etc. The operation button may be, for example, a power button, a sound volume adjustment button, etc., or operation keys for inputting characters arranged in a predetermined order.

For example, when the user performs a predetermined operation on the screen of the display unit 33, or presses one of the above operation buttons, the display unit 33 detects the touched position on the screen. Furthermore, the display unit 33 is able to display an application execution result, content, an icon, a cursor, etc., on the screen.

The sensor unit 35 detects the motion, etc., of the terminal 11 that is detected at a certain time point or that is detected continuously. For example, the sensor unit 35 detects the tilt angle, the acceleration, the direction, the position, etc., of the terminal 11; however, the detected elements are not so limited. Note that examples of the sensor unit 35 are a tilt sensor, an acceleration sensor, a gyro sensor, a Global Positioning System (GPS), etc.; however, the sensor unit 35 is not so limited.

The power unit 36 supplies power to the respective units of the terminal 11. The power unit 36 is, for example, an internal power source such as a battery, etc.; however, the power unit 36 is not so limited. The power unit 36 may detect the amount of power regularly or at predetermined time intervals, and monitor the remaining amount of power, etc.

The wireless unit 37 is a unit for sending and receiving communication data, which receives radio signals (communication data) from a base station (mobile network) by using an antenna, etc., and sends radio signals to the base station via the antenna.

The short-range communication unit 38 enables short-range communication with computers such as other terminals 11, etc., by using a communication method such as infrared-ray communication, WiFi (registered trademark), Bluetooth (registered trademark), etc. The wireless unit 37 and the short-range communication unit 38 are communication interfaces that enable the transmission and reception of data with other computers.

The secondary storage device 39 is a storage unit such as a HDD (Hard Disk Drive), a SSD (Solid State Drive), etc. The secondary storage device 39 stores various programs, etc., and inputs and outputs data according to need.

The main storage device 40 stores execution programs, etc., read from the secondary storage device 39 according to an instruction from the CPU 41, and stores various kinds of information, etc., obtained while the CPU 41 is executing programs. The main storage device 40 is, for example, a Read-Only Memory (ROM) and a Random Access Memory (RAM), etc.; however, the main storage device 40 is not so limited.

The CPU 41 realizes various processes of output control, by controlling processes of the overall computer such as various operations, input and output of data with the hardware elements, etc., based on a control program such as an OS (Operating System) or execution programs stored in the main storage device 40.

Specifically, the CPU 41 performs a process corresponding to a program in the main storage device 40, by executing a program installed in the secondary storage device 39, based on an instruction to execute the program obtained from, for example, the operation unit 34, etc. For example, the CPU 41 performs processes such as taking images by the imaging unit 22, detecting an AR marker included in the captured image (acquired image) by the detection unit 25, acquiring AR content corresponding to an AR marker ID by the acquiring unit 26, generating a superimposition display screen by the screen generating unit 27, and implementing display control on the AR content by the display control unit 28, by executing the terminal control program. Note that the process contents at the CPU 41 are not limited to the above. The contents executed by the CPU 41 are stored in the secondary storage device 39, etc., according to need.

In the drive device 42, for example, a recording medium 43, etc., may be detachably set, and the drive device 42 reads various kinds of information recorded in the recording medium 43 that has been set, and writes predetermined information in the recording medium 43. The drive device 42 is, for example, a medium loading slot; however, the drive device 42 is not so limited.

The recording medium 43 is a computer-readable recording medium storing execution programs, etc., as described above. The recording medium 43 may be, for example, a semiconductor memory such as a flash memory. Furthermore, the recording medium 43 may be a portable recording medium such as a USB memory, etc.; however, the recording medium 43 is not so limited.

In the present embodiment, by installing an execution program (for example, a terminal control program, etc.) in the hardware configuration of the computer main body described above, the hardware resources and the software are able to cooperate with each other and realize the terminal control process, etc., according to the present embodiment.

Furthermore, the terminal control program corresponding to the terminal control process described above may be, for example, resident in the device, or may be activated according to an activation instruction.

<Example of Functional Configuration of Server 12>

Figure 4:
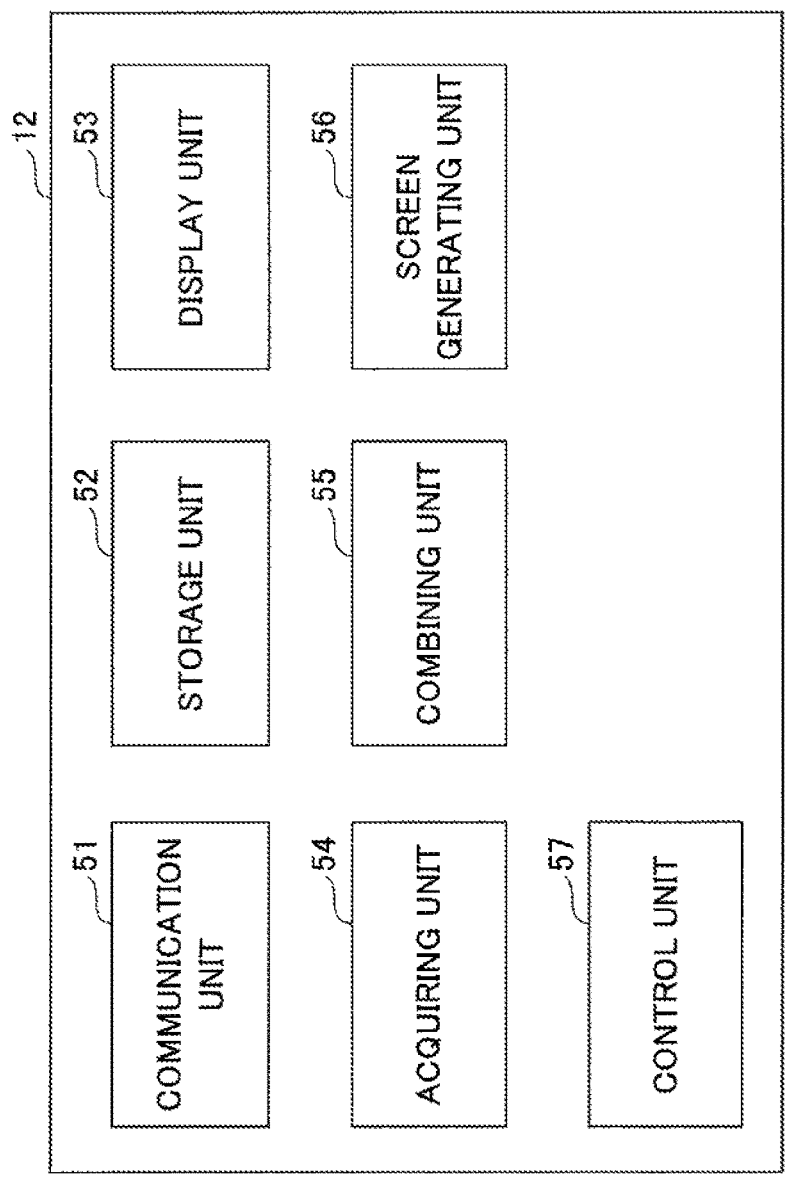
FIG. 4 illustrates an example of a functional configuration of a server.

Next, a description is given of an example of a functional configuration of the server 12 described above, with reference to a drawing. FIG. 4 illustrates an example of a functional configuration of the server 12. The server 12 includes a communication unit 51, a storage unit 52, a display unit 53, an acquiring unit 54, a combining unit 55, a screen generating unit 56, and a control unit 57.

The communication unit 51 transmits and receives data with the terminal 11, other computers, etc., via the communication network 13. For example, the communication unit 51 receives a request to register (store) AR content, etc., corresponding to an authoring process from the terminal 11, AR content to be registered in association with an AR marker, etc. The received information is stored in the storage unit 52. The communication unit 51 may send this information in response to an acquisition request from the terminal 11 with respect to the information stored in the storage unit 52.

Furthermore, the communication unit 51 acquires the captured image, the AR marker ID, and the position information of the AR marker ID in the image, etc., sent from the terminal 11. Furthermore, the communication unit 51 may acquire the AR content ID instead of the AR marker ID, and the position information of the AR content ID.

The storage unit 52 stores various kinds of information (for example, an AR marker DB, AR content DB, etc.) needed for the screen generating process at the server 12 according to the present embodiment. Note that the various kinds of information described above may be managed in units of identification information of the terminal 11 (for example, a terminal ID), or in units of identification information of the user (for example, a user ID).

Furthermore, the storage unit 52, etc., may temporarily store the displayed AR content as a cache, when the AR content is to be fixedly displayed, etc. The information stored by the storage unit 52 is not limited to the above contents. Furthermore, the storage unit 52 may write or read information according to control by the control unit 57 etc.

The display unit 53 displays, for example, the captured image received from the terminal by the communication unit 21, on a screen. Furthermore, the display unit 53 displays a composite image in which the captured image and the AR content are combined by the combining unit 55, on a screen.

The acquiring unit 54 acquires AR content corresponding to the AR marker ID obtained from the terminal 11, and acquires AR content corresponding to the AR content ID. Furthermore, the acquiring unit 54 acquires information of an instruction to fix (stop) one or more AR contents being displayed or an instruction to release the fixed (stopped) AR content from the terminal 11, and implements control, etc., relevant to the combining process by the combining unit 55, based on the acquired information.

The combining unit 55 combines the captured image with the AR content, based on the captured image and the identification information of the AR marker and the AR content, and the position information of the AR marker and the AR content in the image, sent from the terminal 11. For example, the combining unit 55 combines the AR content with the captured image at a predetermined position in the captured image to form a single image, based on the AR content acquired by the acquiring unit 54 and the relative coordinates from the AR marker position of the AR content. Furthermore, when a fixing (stopping) operation is performed at the terminal 11, the combining unit 55 combines the content before the fixing operation with the captured image acquired after the fixing operation.

Note that a composite image is generated at the server 12, instead of displaying and superimposing AR content on a captured image as in the case of the terminal 11, because of the following reason. Specifically, in order for the server 12 to display and superimpose AR content on a captured image acquired from the terminal 11, a special process (program, etc.) is needed for this purpose. However, by generating a composite image, for example, the server 12 is able to display an image (video) by using general-purpose software such as a browser, etc.

Furthermore, when the combining unit 55 receives an instruction that the AR content is fixed from the terminal, the combining unit 55 does not have to perform a combining process with respect to the AR content. Furthermore, when the combining unit 55 does not receive identification information and position information of an AR marker or AR content from the terminal 11, the combining unit 55 does not have to perform the combining process. Furthermore, when the combining unit 55 receives identification information and position information of an AR marker or AR content, but the AR content is not positioned on the captured image, the combining unit 55 does not have to perform the combining process.

The screen generating unit 56 generates a screen for displaying the composite image formed by the combining unit 55 on a display unit. Furthermore, the screen generating unit 56 displays the generated image on the screen of the display unit 53. Furthermore, when the contents that have been instructed by a remote supporter, etc., with respect to the generated screen is accepted, the screen generating unit 56 may send the contents to the terminal 11 via the communication unit 51.

The control unit 57 controls all units in the server 12. For example, the control unit 57 performs processes of sending and receiving various kinds of information by the communication unit 51, displaying a composite image by the display unit 53, acquiring information by the acquiring unit 54, combining images by the combining unit 55, generating a screen by the screen generating unit 56, etc. The control contents implemented by the control unit 57 are not limited to the above; for example, the control unit 57 may perform a process when the screen generating process at the server 12 starts and ends, when an error occurs, etc.

<Example of Hardware Configuration of Server 12>

Figure 5:
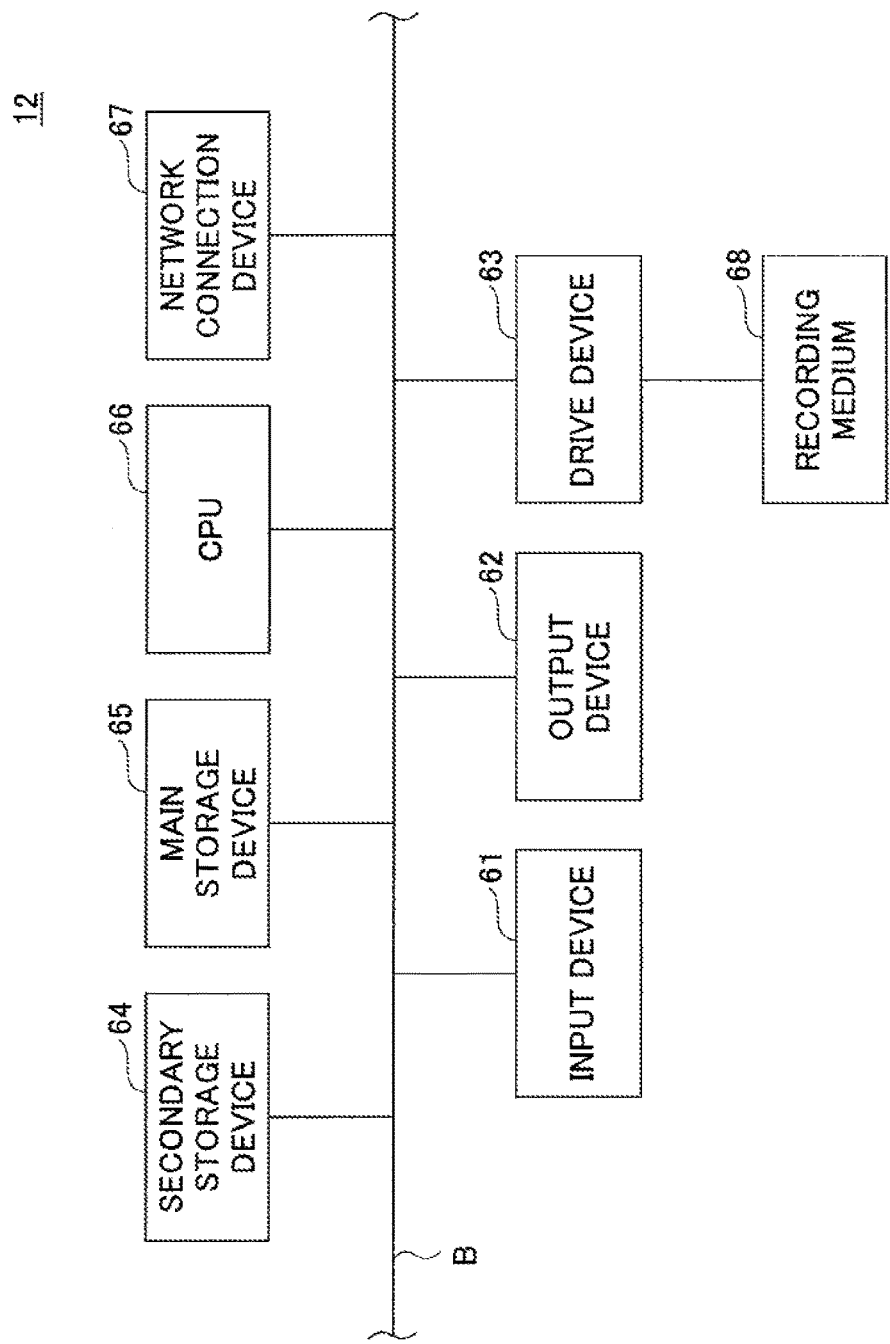
FIG. 5 illustrates an example of a hardware configuration of the server.

Next, a description is given of an example of a hardware configuration of the server 12, with reference to a drawing. FIG. 5 illustrates an example of a hardware configuration of the server 12. In the example of FIG. 5, the server 12 includes an input device 61, an output device 62, a drive device 63, a secondary storage device 64, a main storage device 65, a CPU 66, and a network connection device 67, which are interconnected by a system bus B.

The input device 61 includes a keyboard, a pointing device such as a mouse, and a voice sound input device such as a microphone, which are operated by a user, etc., and accepts input of an instruction to execute a program, various kinds of operation information, information for activating software, etc., from a user, etc.

The output device 62 includes a display, etc., for displaying various windows, data, etc., needed for operating the computer main body (server 12) for performing processes according to the present embodiment. The output device 62 is able to display the execution progression of a program and the execution result of a program, by a control program included in the CPU 66.

Here, in the present embodiment, for example, the execution program installed in the computer main body is provided by a recording medium 68, etc. The recording medium 68 may be set in the drive device 63. Based on control signals from the CPU 66, an execution program stored in the recording medium 68 is installed in the secondary storage device 64 from the recording medium 68 via the drive device 63.

The secondary storage device 64 is, for example, a storage unit such as a HDD, a SSD, etc. The secondary storage device 64 stores an execution program (screen generating program) according to the present embodiment, control programs provided in the computer, etc., and inputs and outputs data according to need, based on control signals from the CPU 66. The secondary storage device 64 may read/write information that is needed from/in the stored information, based on control signals from the CPU 66, etc.

The main storage device 65 stores execution programs, etc., read from the secondary storage device 64 by the CPU 66. The main storage device 65 is, for example, a ROM, a RAM, etc.

The CPU 66 realizes various processes by controlling processes of the overall computer such as various operations, input and output of data with the hardware elements, etc., based on a control program such as an OS or execution programs stored in the main storage device 65. Various kinds of information, etc., needed for executing a program may be acquired from the secondary storage device 64, and execution results may be stored in the secondary storage device 64.

Specifically, the CPU 66 performs a process corresponding to the program in the main storage device 65, by executing a program installed in the secondary storage device 64, based on an instruction to execute the program obtained from, for example, the input device 61. For example, by executing a screen generating program, the CPU 66 performs processes such as sending and receiving various kinds of information by the communication unit 51, displaying a composite image by the display unit 53, acquiring information by the acquiring unit 54, combining images by the combining unit 55, generating a screen by the screen generating unit 56, etc. The process contents at the CPU 66 are not limited to the above. The contents executed by the CPU 66 are stored in the secondary storage device 64, etc., according to need.

The network connection device 67 performs communication with the terminal 11 and other external devices, via the communication network 13 described above. The network connection device 67 acquires execution programs, software, setting information, etc., from an external device, etc., by connecting to the communication network 13, etc., based on control signals from the CPU 66. Furthermore, the network connection device 67 may provide the execution results obtained by executing a program to the terminal 11, etc., and may provide the execution program per se according to the present embodiment to an external device, etc.

The recording medium 68 is a computer-readable recording medium storing execution programs, etc., as described above. The recording medium 68 may be, for example, a semiconductor memory such as a flash memory, a portable recording medium such as a CD-ROM, a DVD, etc.; however, the recording medium 68 is not so limited.

By installing an execution program (for example, a screen generating program, etc.) in the hardware configuration illustrated in FIG. 5, the hardware resources and the software are able to cooperate with each other and realize the screen generating process, etc., according to the present embodiment.

<Examples of Data>

Examples of data used in the terminal control process and the screen generating process (image generating process) according to the present embodiment are described. FIG. 6 illustrates an example of an AR marker DB. The AR marker DB illustrated in FIG. 6 includes items of, for example, "AR marker ID", "AR marker pattern", etc.; however, the items are not so limited. The "AR marker ID" is identification information for identifying the AR marker. The "AR marker pattern" stores the marker pattern (pattern and shape) to be the reference, in a process of recognizing whether an AR marker is present in an image taken by the imaging unit 22. The marker pattern may be different for each ID, or there may be a plurality of marker patterns with respect to a single ID.

In the example of FIG. 6, a marker pattern having a reference size that is set in advance as viewed from the front is stored, and the distortion is detected by comparing this image with the AR marker that has been photographed. For example, the control unit 29 may control (correct) the orientation, the angle, the size, etc., according to need.

Furthermore, the AR marker DB according to the present embodiment is not limited to AR markers; for example, the identification information (ID) corresponding to the feature information of other reference objects such as real objects, etc., may be managed.

FIG. 7 illustrates an example of the AR content DB. The AR content DB illustrated in FIG. 7 includes items of, for example, "AR content ID", "AR content", "AR marker ID", "relative coordinates from AR marker", etc.; however, the items are not so limited.

The "AR content ID" is identification information for identifying AR content to be displayed and superimposed on a screen. The "AR content" stores the image of the AR content (video image, still image), text information, etc. Note that the AR content may be real data, or may be a texture path. A texture path is the storage destination information of AR content corresponding to the AR content ID. For example, the texture path may be address information of the server 12 or a device other than the server 12, etc., such as "http://xxx.png", or a storage destination such as a folder, etc.; however, the texture path is not so limited. Furthermore, in the texture path, information (file name) of image data, video data, text data, etc., corresponding to the AR content, may be directly stored.

The "AR marker ID" is related to the AR marker ID in the AR marker DB. The "AR marker ID" is identification information of the AR marker corresponding to the AR content. In the present embodiment, the AR content ID and the AR marker ID may be set in a one-on-one manner, or may be set in a relationship of n to one or one to n. In the example of FIG. 7, a plurality of AR content IDs "OBJID1", "OBJID2" are set for an AR marker ID "ARID1".

The "relative coordinates from AR marker" stores information of the direction and the distance of the position where the AR content is to be displayed, with reference to the AR marker. The "relative coordinates from AR marker" is at least one of the "coordinate values", "rotation angle", "magnification/reduction ratio", etc., described above. The "coordinate values" are two-dimensional or three dimensional position information of the position where the AR content is to be displayed. The "coordinate values" may be set based on, for example, the position information, the orientation information, etc., of the terminal 11.

Furthermore, the examples of data used in the terminal control process or the screen generating process according to the present embodiment are not limited to the above examples; for example, data such as a list of AR marker IDs and a list of AR content IDs that are fixed on the screen, etc., may be used. Furthermore, the above examples of data may be included in the terminal 11 or in the server 12. The terminal 11 is able to download the data managed by the server 12, and is able to upload data to the server 12.

<Overview of Process According to Present Embodiment>

Figure 8:
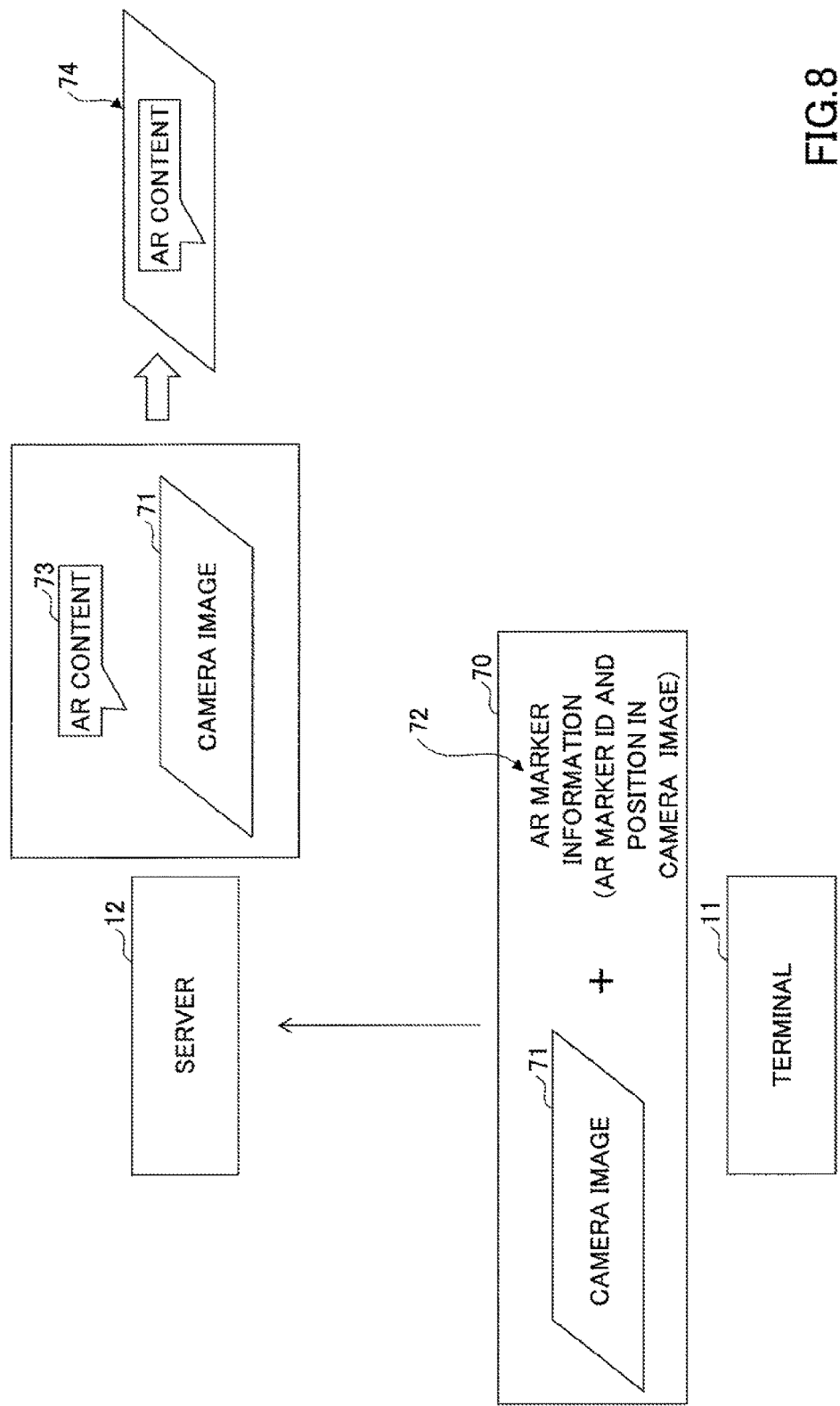
FIG. 8 illustrates an overview of a process according to an embodiment.

Next, a description is given of an overview of a process according to the present embodiment, with reference to a drawing. FIG. 8 illustrates an overview of the process according to the present embodiment. In the present embodiment, for example, in a case where the terminal 11 does not have very high processing performance (specs) such as a HMD, etc., when an image is formed by combining images and the composite image is sent to the server 12 of a remote supporter, the frame rate (fps; frames per second) of a camera, which is an example of the imaging unit 22, becomes low, and the screen is not smoothly shared with the remote supporter. This is caused because it takes time for the image combining process at the terminal 11, and the amount of data communicated to the server 12 is large in comparison with the line speed.

Thus, in the present embodiment, as illustrated in the example of FIG. 8, the images are not combined at the terminal 11, but the images are combined at the server 12. Specifically, data 70, which is sent from the terminal 11 to the server 12, includes a camera image (captured image) 71 and AR marker information (AR marker ID and position in camera image) 72 detected from the camera image 71 at the terminal 11. Furthermore, in the present embodiment, AR content 73 is acquired from the AR marker information at the server 12, a composite image 74 is generated by combining the AR content with the camera image, and the composite image 74 is displayed on a screen. As described above, by combining the images at the server 12, the processing time is reduced and the data transmission amount is reduced, and therefore the screen is smoothly shared with the remote supporter. Furthermore, the communicated image is not deteriorated when performing communication with the server 12 after the images are combined.

Furthermore, in the present embodiment, in a process performed when remote support is provided, when only the AR content is stopped at a fixed position in the camera image while the AR content is displayed, the AR content is cached in the server 12 when the AR content is stopped (fixed). In the stopped state, when the server 12 performs the combining process, the AR content immediately before being stopped, which has been held at the server 12, is combined with the camera image and the composite image is displayed. By combining the AR content immediately before being stopped, which has been held at the server 12, with the camera image, it is possible to omit the process of acquiring the AR content from the AR marker information, and therefore the processing time, which is taken until generating an displaying a composite image, is reduced.

Accordingly, the remote supporter is able to cooperate with a terminal 11 having low spec such as a HMD, etc., and the remote supporter is able to share not only the camera image of the site with the terminal 11, but also the AR content. Therefore, both the worker at the site and the remote supporter are able to use the AR content, and at the terminal 11, additional processes other than the existing processes may be minimized.

<Examples of Terminal Control Process and Screen Generating Process>

Next, examples of the terminal control process by the terminal 11 and the screen generating process (image generating process) by the server 12 according to the present embodiment are described with reference to flowcharts, etc. Note that in the following embodiments, the process at the terminal 11 and the process at the server 12 corresponding to the process at the terminal 11 are separately described.

<First Embodiment>

Figure 9:
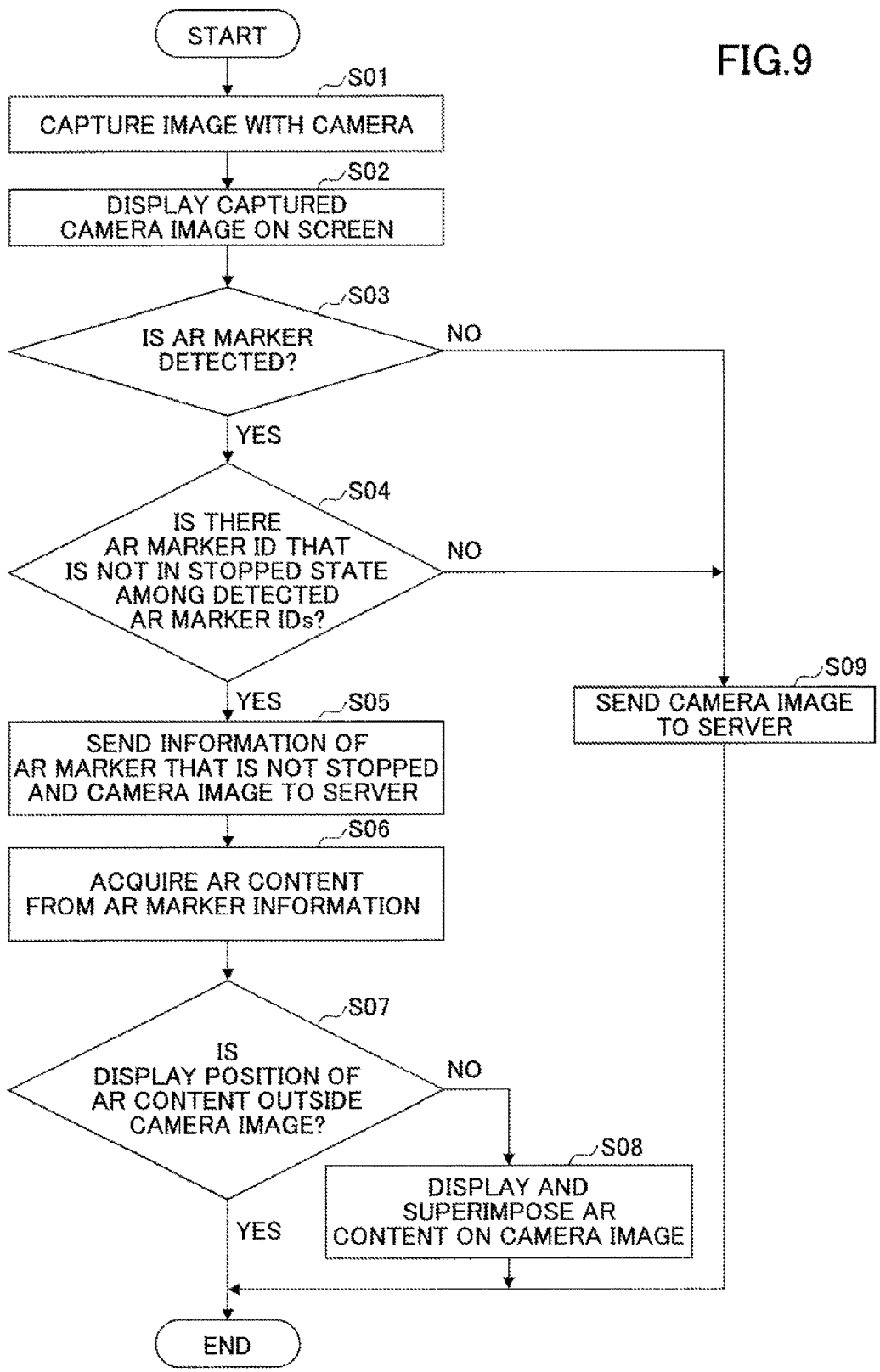
FIG. 9 is a flowchart of an example of a terminal control process by the terminal according to a first embodiment.

FIG. 9 is a flowchart of an example of a terminal control process by the terminal 11 according to a first embodiment. In the example of FIG. 9, the terminal 11 captures an image of target area with the camera (imaging unit 22) (step S01), and displays the captured camera image (captured image) on the screen of the display unit 24 (step S02).

Next, the detection unit 25 of the terminal 11 determines whether one or more AR markers (image of AR marker included in camera image) are detected in the camera image being displayed on the display unit 24 (step S03). When an AR marker is detected (YES in step S03), the detection unit 25 determines whether there is an AR marker ID that is not in a stopped (fixed) state among the detected AR marker IDs (step S04). A stopped state is a state where an instruction is given to stop (fix) the display of the AR content in the screen display (the stopped state is not released), by an operation on the terminal 11 by the user, as described below.

When there is an AR marker ID that is not in a stopped state (YES in step S04), the terminal 11 sends the AR marker information of the AR marker ID that is not stopped (for example, the AR marker ID, the position information, etc.), and the camera image, to the server 12 (step S05). Note that in the process of step S05, instead of sending the AR marker information, the terminal 11 may acquire one or more AR content IDs associated with the AR marker ID, and send the acquired AR content ID and position information to the server 12. In this case, the position information may be the position coordinates of the AR content in the screen, or the position information of the AR marker, or relative position coordinates with reference to the position information of the AR marker, etc.

Next, the acquiring unit 26 acquires one or more AR contents from the AR marker information (step S06). Next, the terminal 11 determines whether the display position of the acquired AR content is outside the camera image (step S07), and when the display position is not outside the camera image (NO in step S07), the terminal 11 displays and superimposes the AR content on the camera image (step S08).

Furthermore, in the process of step S03, when an AR marker is not detected (NO in step S03), in the process of step S04, when there is no AR marker ID that is not in a stopped state among the detected AR marker IDs (NO in step S04), the terminal 11 sends the camera image to the server 12 (step S09). Note that in the process of step S04, a case where there is no AR marker ID that is not in a stopped state among the detected AR marker IDs, means that the AR contents corresponding to all of the AR marker IDs are in a stopped state, and that all of the AR contents are already fixedly displayed and superimposed on the camera image.

Furthermore, in the process of step S07, when the display position of the acquired AR content is outside the camera image (YES in step S07), that is, when the display position of the AR content is not on the camera image, the processes is ended after the process of step S08 or the process of step S09.

Figure 10:
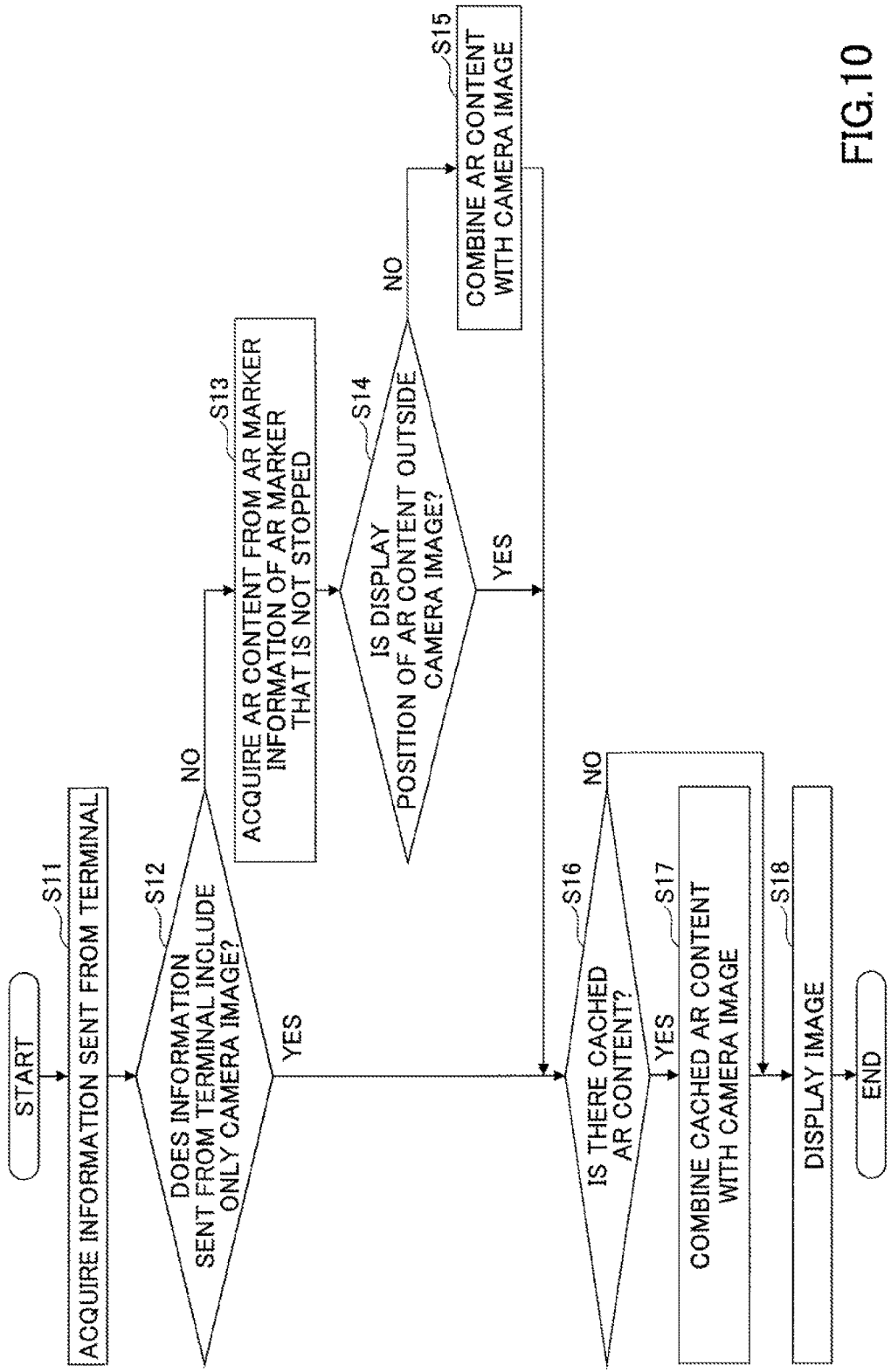
FIG. 10 is a flowchart of an example of a screen generating process by the server according to the first embodiment.

FIG. 10 is a flowchart of an example of a screen generating process by the server 12 according to the first embodiment. In the example of FIG. 10, the communication unit 51 of the server 12 acquires the information sent from the terminal 11 (step S11), and the server 12 determines whether the information sent from the terminal 11 includes only a camera image (step S12). When the information does not only include a camera image (NO in step S12), the acquiring unit 54 acquires one or more AR contents from the AR marker information of the AR marker that is not stopped (step S13). Note that in the process of step S13, for example, when AR content ID is received from the terminal 11, the acquiring unit 54 may acquire one or more AR contents associated with the AR content ID.

Furthermore, the combining unit 55 determines whether the display position of the acquired AR content is outside the camera image (step S14). When the display position is not outside the camera image (NO in step S14), the combining unit 55 combines the AR content with the camera image (step S15).

Furthermore, in the process of step S12, when the information sent from the terminal 11 only includes a camera image (YES in step S12), or in the process of step S14, the display position of the acquired AR content is outside the camera image (YES in step S14), or after the process of step S15, the server 12 determines whether there is any AR content cached in the storage unit 52, etc. (step S16). When there is AR content cached in the storage unit 52, etc. (YES in step S16), the combining unit 55 combines the cached AR content with the camera image (step S17). Furthermore, in the process of step S16, when there is no AR content cached in the storage unit 52, etc. (NO in step S16), or after the process of step S17, the server 12 displays the image on the display unit 53, etc. (step S18), and ends the process.

<Second Embodiment>

Next, a description is given of a second embodiment with reference to flowcharts. In the second embodiment, a description is given of an example in which the AR content on the screen is stopped (fixed) (newly stopped) from the state of the first embodiment, with reference to drawings.

Figure 11:
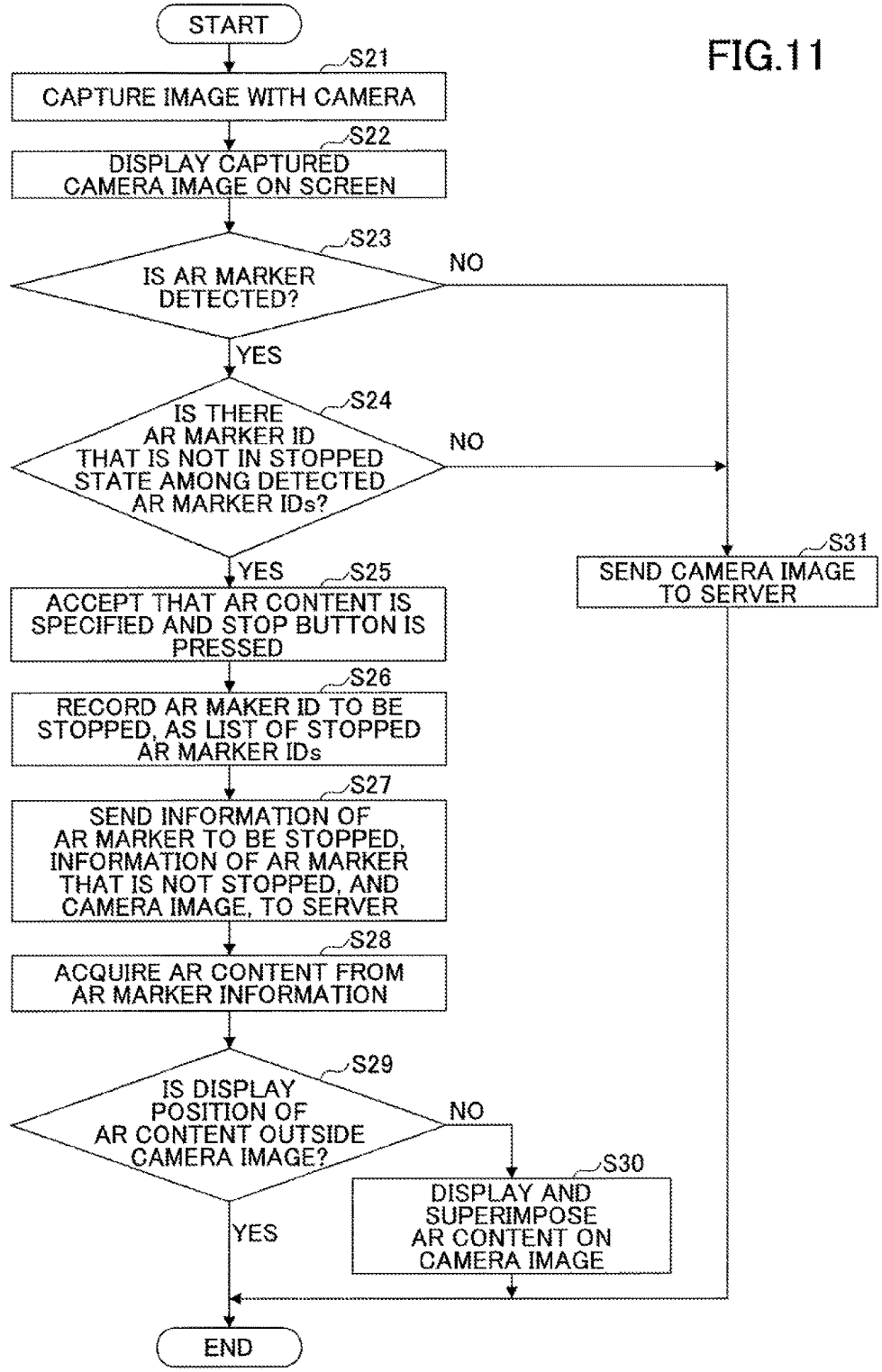
FIG. 11 is a flowchart of an example of a terminal control process by the terminal according to a second embodiment.

FIG. 11 is a flowchart of an example of a terminal control process by the terminal 11 according to the second embodiment. In the example of FIG. 11, in steps S21 through S24, the same processes as those of steps S01 through S04 of the first embodiment are performed, and therefore detailed descriptions of these steps are omitted. In the process of step S24, when there is an AR marker ID that is not in a stopped (fixed) state among the detected AR marker IDs (YES in step S24), the display control unit 28 accepts that AR content has been specified and a stop button has been pressed (step S25). Next, the display control unit 28 records the AR maker ID to be stopped as a list of stopped AR marker IDs (for example, list information) in the storage unit 23, etc. (step S26).

Next, the terminal 11 sends the information of the AR marker to be stopped, the information of the AR marker that is not stopped, and the camera image, to the server 12 (step S27). Note that the process of step S27 may be to send the AR content ID acquired from the AR marker information, etc., instead of sending the AR marker information. Next, the acquiring unit 26 acquires the AR content from the AR marker information (step S28).

Next, the terminal 11 determines whether the display position of the acquired AR content is outside the camera image (step S29), and when the display position is not outside the camera image (NO in step S29), the terminal 11 displays and superimposes the AR content on the camera image (step S30). Furthermore, in the process of step S23, when an AR marker is not detected (NO in step S23), and in the process of step S24, when there is no AR marker ID that is not in a stopped state among the detected AR marker IDs (NO in step S24), the terminal 11 sends the camera image to the server 12 (step S31). Note that in the process of step S24, a case where there is no AR marker ID that is not in a stopped state among the detected AR marker IDs, means that the AR contents corresponding to all of the AR marker IDs are in a stopped state, and that all of the AR contents are already fixedly displayed and superimposed on the camera image.

Furthermore, in the process of step S29, when the display position of the acquired AR content is outside the camera image (YES in step S29), that is, when the display position of the AR content is not on the camera image, the processes is ended after the process of step S30 or the process of step S31.

Figure 12:
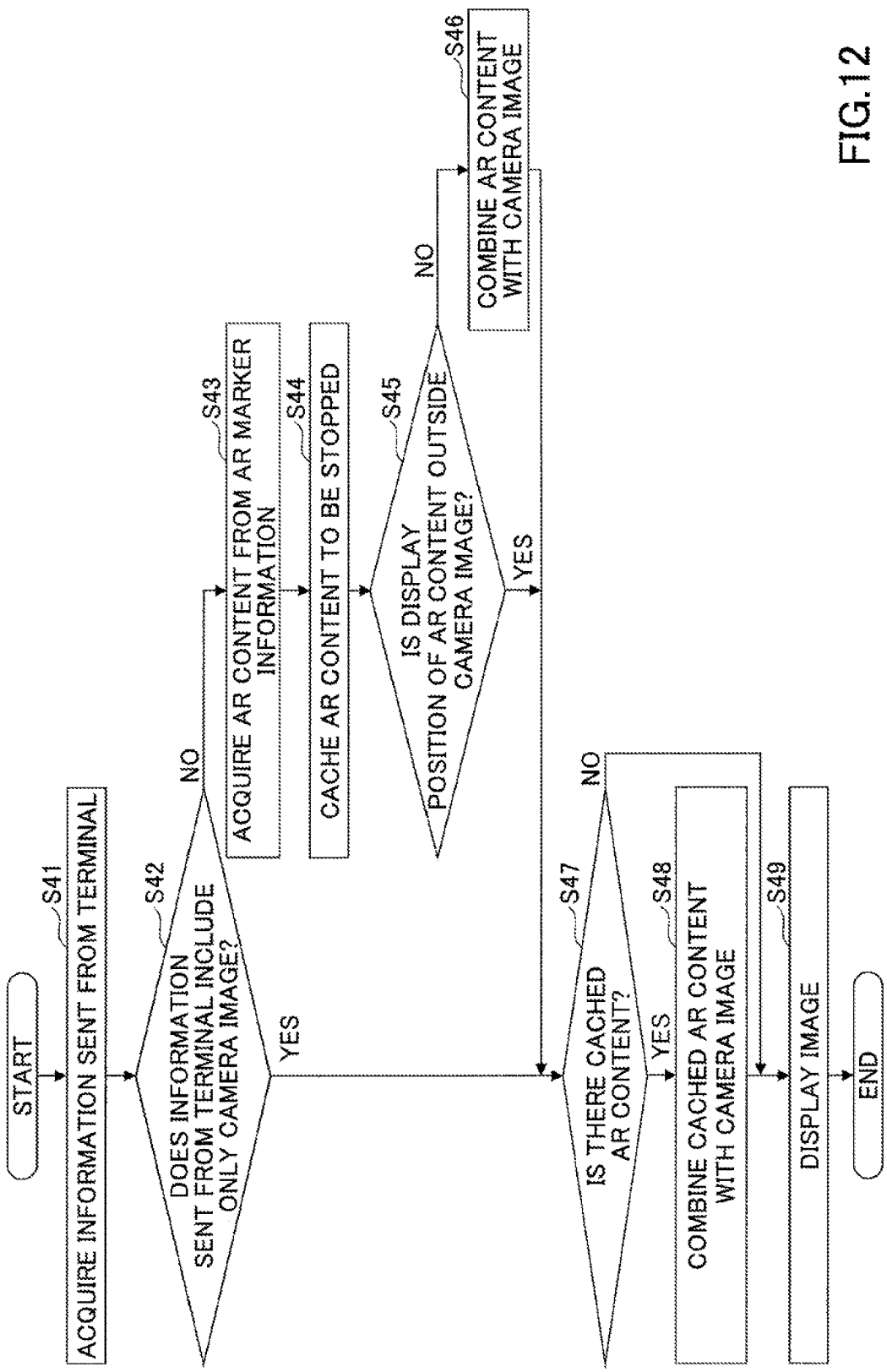
FIG. 12 is a flowchart of an example of a screen generating process by the server according to the second embodiment.

FIG. 12 is a flowchart of an example of a screen generating process by the server 12 according to the second embodiment. In the example of FIG. 12, in steps S41 and S42, the same processes as those of steps S11 and S12 of the first embodiment are performed, and therefore detailed descriptions of these steps are omitted. In the process of step S42, when the information does not only include a camera image (NO in step S42), the acquiring unit 54 acquires one or more AR contents from the AR marker information (step S43), and caches the AR content to be stopped (step S44). Note that in the process of step S43, the acquiring unit 54 may acquire AR content from the AR content ID, etc., instead of the AR marker information. Furthermore, in the process of step S44, the position information of the AR content is also cached.

Furthermore, in the example of FIG. 12, in steps S45 through S49, the same processes as those of steps S14 through S18 of the first embodiment are performed, and therefore detailed descriptions of these steps are omitted.

<Third Embodiment>

Next, a description is given of a third embodiment with reference to flowcharts. In the third embodiment, a description is given of an example in which the stopped state of the AR content set in the second embodiment is released (newly released).

Figure 13:
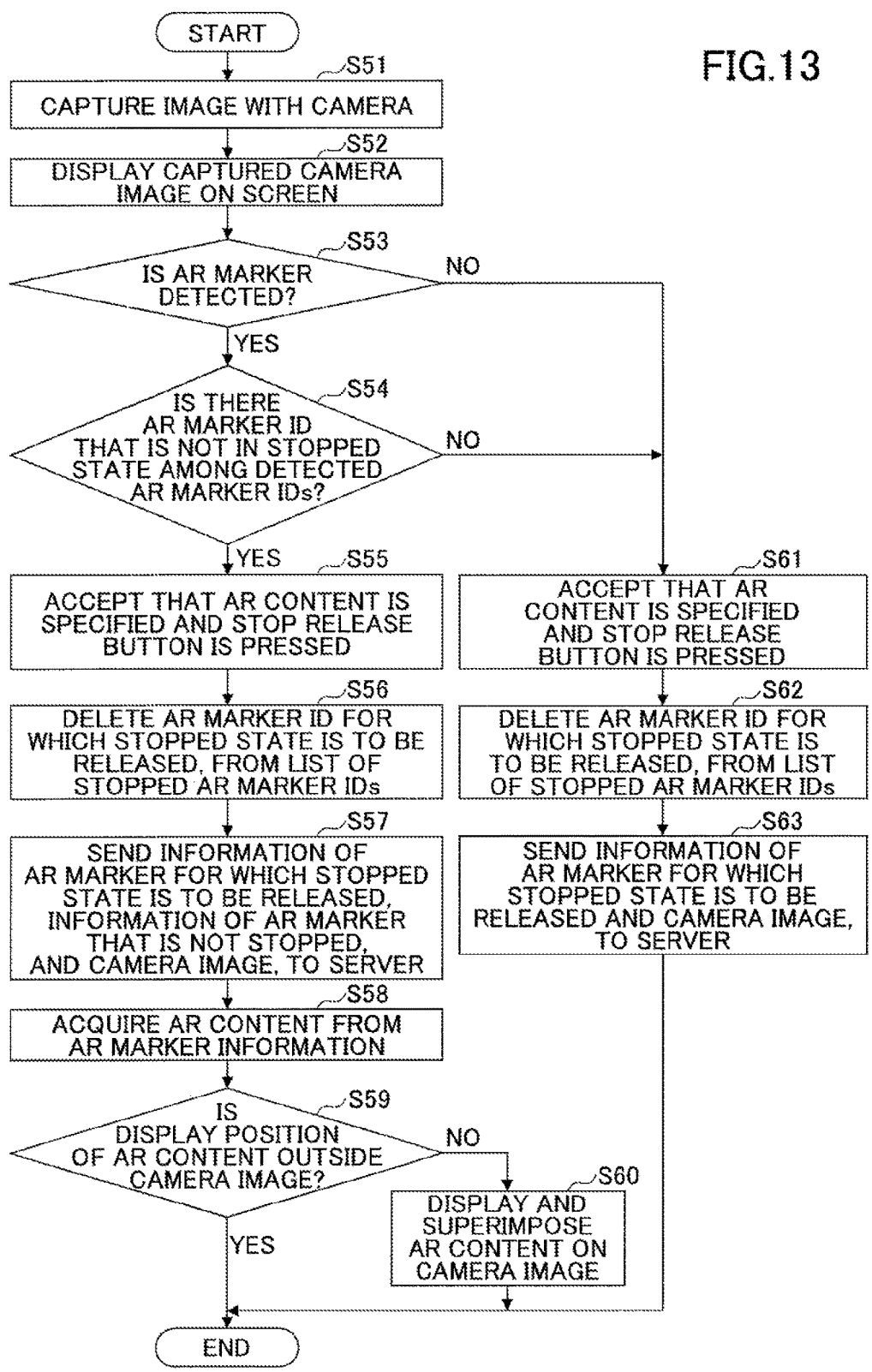
FIG. 13 is a flowchart of an example of a terminal control process by the terminal according to a third embodiment.

FIG. 13 is a flowchart of an example of a terminal control process by the terminal 11 according to the third embodiment. In the example of FIG. 13, in steps S51 through S54, the same processes as those of steps S01 through S04 of the first embodiment are performed, and therefore detailed descriptions of these steps are omitted. In the process of step S54, when there is an AR marker ID that is not in a stopped (fixed) state among the detected AR marker IDs (YES in step S54), the detection unit 25 accepts that AR content has been specified and a stop release button has been pressed (step S55). Next, the detection unit 25 deletes the AR marker ID for which the stopped state is to be released, from the list of stopped AR marker IDs (step S56). Furthermore, the terminal 11 sends the information of the AR marker for which the stopped state is to be released, the information of the AR marker that is not stopped, and the camera image, to the server 12 (step S57).

Next, the acquiring unit 26 acquires one or more AR contents from the AR marker information (step S58). Next, the terminal 11 determines whether the display position of the acquired AR content is outside the camera image (step S59), and when the display position is not outside the camera image (NO in step S59), the terminal 11 displays and superimposes the AR content on the camera image (step S60).

Furthermore, in the process of step S53, when an AR marker is not detected (NO in step S53), and in the process of step S54, when there is no AR marker ID that is not in a stopped state among the detected AR marker IDs (NO in step S54), the detection unit 25 accepts that AR content has been specified and a stop release button has been pressed (step S61). Note that in the process of step S54, a case where there is no AR marker ID that is not in a stopped state among the detected AR marker IDs, means that the AR contents corresponding to all of the AR marker IDs are in a stopped state, and that all of the AR contents are already fixedly displayed and superimposed on the camera image.

Next, the detection unit 25 deletes the AR marker ID for which the stopped state is to be released, from the list of stopped AR marker IDs in the storage unit 23 (step S62). Furthermore, the terminal 11 sends the information of the AR marker for which the stopped state is to be released and the camera image to the server 12 (step S63).

Furthermore, in the process of step S59, when the display position of the acquired AR content is outside the camera image (YES in step S59), that is, when the display position of the AR content is not on the camera image, the processes is ended after the process of step S60 or the process of step S63.

FIG. 14 is a flowchart of an example of a screen generating process by the server 12 according to the third embodiment. In the example of FIG. 14, the communication unit 51 of the server 12 acquires the information sent from the terminal 11 (step S71), and deletes the cache of the AR content for which the stopped state is to be released (step S72). Next, the server 12 determines whether the information sent from the terminal 11 includes information of an AR marker for which the stopped state has been released or information of an AR marker that is not stopped (step S73), and when the information sent from the terminal 11 includes information of an AR marker for which the stopped state has been released or information of an AR marker that is not stopped (YES in step S73), the server 12 acquires one or more AR contents from the AR marker information (step S74). Next, the combining unit 55 determines whether the display position of the acquired AR content is outside the camera image (step S75). When the display position is not outside the camera image (NO in step S75), the combining unit combines the AR content with the camera image (step S76).

Next, the server 12 determines whether there is any cached AR content (step S77), and when there is cached AR content (YES in step S77), the combining unit 55 combines the cached AR content with the camera image (step S78).

Next, after the process of step S78, or in the process of step S73, when the information sent from the terminal 11 does not include information of an AR marker for which the stopped state has been released or information of an AR marker that is not stopped (NO in step S73), or in the process of step S75, when the display position of the acquired AR content is outside the camera image (YES in step S75), or in the process of step S77, there is no cached AR content (NO in step S77), the server 12 displays the image on the display unit 53 (step S79), and ends the process.

Here, FIGS. 15A and 15B illustrate the stopped state and the stop released state of the AR content, respectively. In the second embodiment described above, for example, as illustrated in FIG. 15A, in the captured image displayed on a screen 81-1 of the terminal 11 operated by a user 80, an object 82-1 (object A) and an object 82-2 (object B) are displayed in a real space. Furthermore, in the captured image, an image of an AR marker 83 is included, and AR content 84 corresponding to the AR marker 83 is displayed. The AR content 84 is AR content relevant to a manual; however, the AR content is not so limited. Furthermore, the screen generating unit 27 generates a stop button 85 in the screen 81-1. Note that the position, the size, etc., of the stop button 85 are not limited to the example in FIG. 15A.

Here, in the present embodiment, the AR content 84 is displayed upon recognizing the AR marker 83, and then the AR marker 83 is moved to a position that is not displayed in the screen (not detected in the captured image) while referring to the AR content 84. At this time, the display control unit 28, etc., implements fix (present) display control on the AR content 84.

For example, when the user 80 wants to work while looking at the manual of the AR content 84 upon moving to the position of the object 82-2 (object B) from the state of FIG. 15A, the user presses the stop button 85 generated by the screen generating unit 27 in the screen 81-1.

At this time, when a plurality of AR contents 84 are displayed, the user may touch the display area of AR content 84 to be stopped, to select a target AR content 84. Furthermore, when a plurality of AR markers 83 are displayed, the user may touch the display area of an AR marker 83 to be stopped, to select AR content 84 that is associated with the touched AR marker 83.

Accordingly, as illustrated in FIG. 15B, by stopping (fixing) the AR content 84, even when the terminal 11 is moved to a location where the AR marker 83 is not detected, the user is able to move close to the object 82-2 (object B) and work while looking at the manual (AR content 84). If another AR marker, etc., is detected in the captured image while moving, the corresponding AR content will be displayed; however, this AR content is displayed without being stopped (fixed).

Furthermore, when the user 80 selects a stop release button 86 provided in a screen 81-2 with respect to the fixedly displayed AR content 84 as illustrated in FIG. 15B, the stopped (fixed) display of the AR content 84 is released. Note that the position, the size, etc., of the stop release button 86 are not limited to the example of FIG. 15B. In the release state, the AR marker 83 is not displayed in the captured image displayed in the screen 81-2, and therefore the AR content 84 will not be displayed any longer.

In the terminal 11, the stopped state and the stop released state of the AR content described above are displayed in the screen by superimposing the AR content. In the server 12, the stopped state and the stop released state of the AR content described above are displayed in the screen upon forming a composite image. Note that the stop button 85 described above may be a stop button for collectively stopping all of the AR contents or AR markers that are not stopped in the screen 81-1, and when this button is pressed, it is possible to easily stop all of the AR contents.

<Fourth Embodiment>

Figure 16:
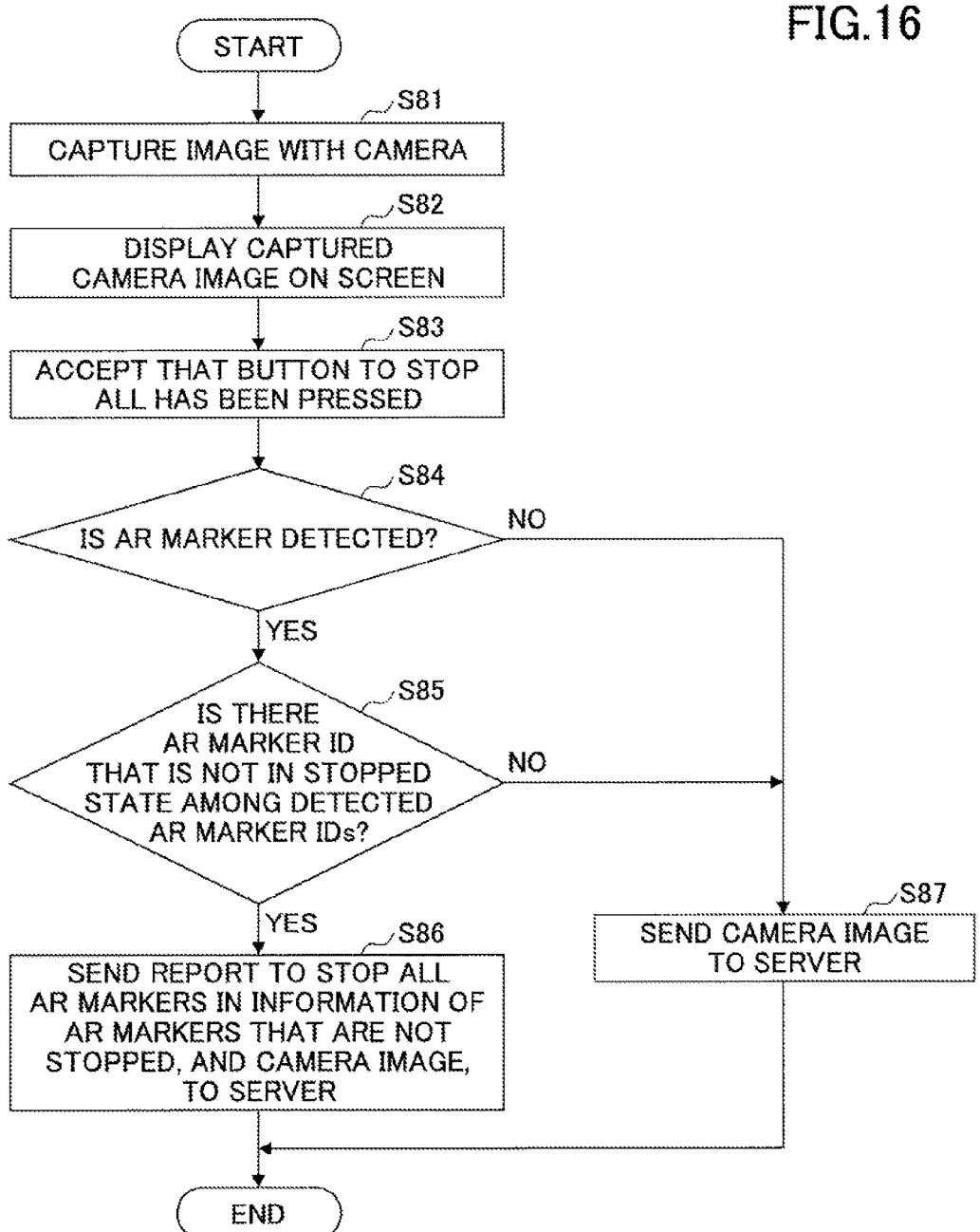
FIG. 16 is a flowchart of an example of a terminal control process by the terminal according to a fourth embodiment.

Next, a description is given of a fourth embodiment with reference to flowcharts. In the fourth embodiment, a description is given of an example in which the AR contents are collectively stopped. FIG. 16 is a flowchart of an example of a terminal control process by the terminal 11 according to the fourth embodiment. In the example of FIG. 16, the terminal 11 captures an image of target area with the camera (imaging unit 22) (step S81), and displays the captured camera image on the screen of the display unit 24 (step S82).

Next, when the terminal 11 accepts that a button for stopping all AR contents is pressed in the screen by user operation, etc. (step S83), the detection unit 25 of the terminal 11 determines whether an AR marker (image of AR marker included in camera image) is detected in the camera image displayed on the display unit 24 (step S84). When the AR marker is detected (YES in step S84), the detection unit 25 determines whether there is an AR marker ID that is not in a stopped (fixed) state among the detected AR marker IDs, at the stage before the button for stopping all AR contents is pressed in the process of step S83 (step S85).

When there is an AR marker ID that is not in a stopped state (YES in step S85), the acquiring unit 26 sends a report to stop all AR markers in the information of AR markers that are not stopped, and the camera image, to server 12 (step S86).

Furthermore, in the process of step S84, when an AR marker is not detected (NO in step S84), in the process of step S85, when there is no AR marker ID that is not in a stopped state among the detected AR marker IDs (NO in step S85), the detection unit 25 sends the camera image to the server 12 (step S87). Note that in the process of step S85, a case where there is no AR marker ID that is not in a stopped state among the detected AR marker IDs, means that the AR contents corresponding to all of the AR marker IDs are in a stopped state, and that all of the AR contents are already fixedly displayed and superimposed on the camera image. Furthermore, also in the process of step S86, the AR contents corresponding to all of the AR marker IDs are in a stopped state, and therefore in this state all of the AR contents are already fixedly displayed and superimposed on the camera image.

Figure 17:
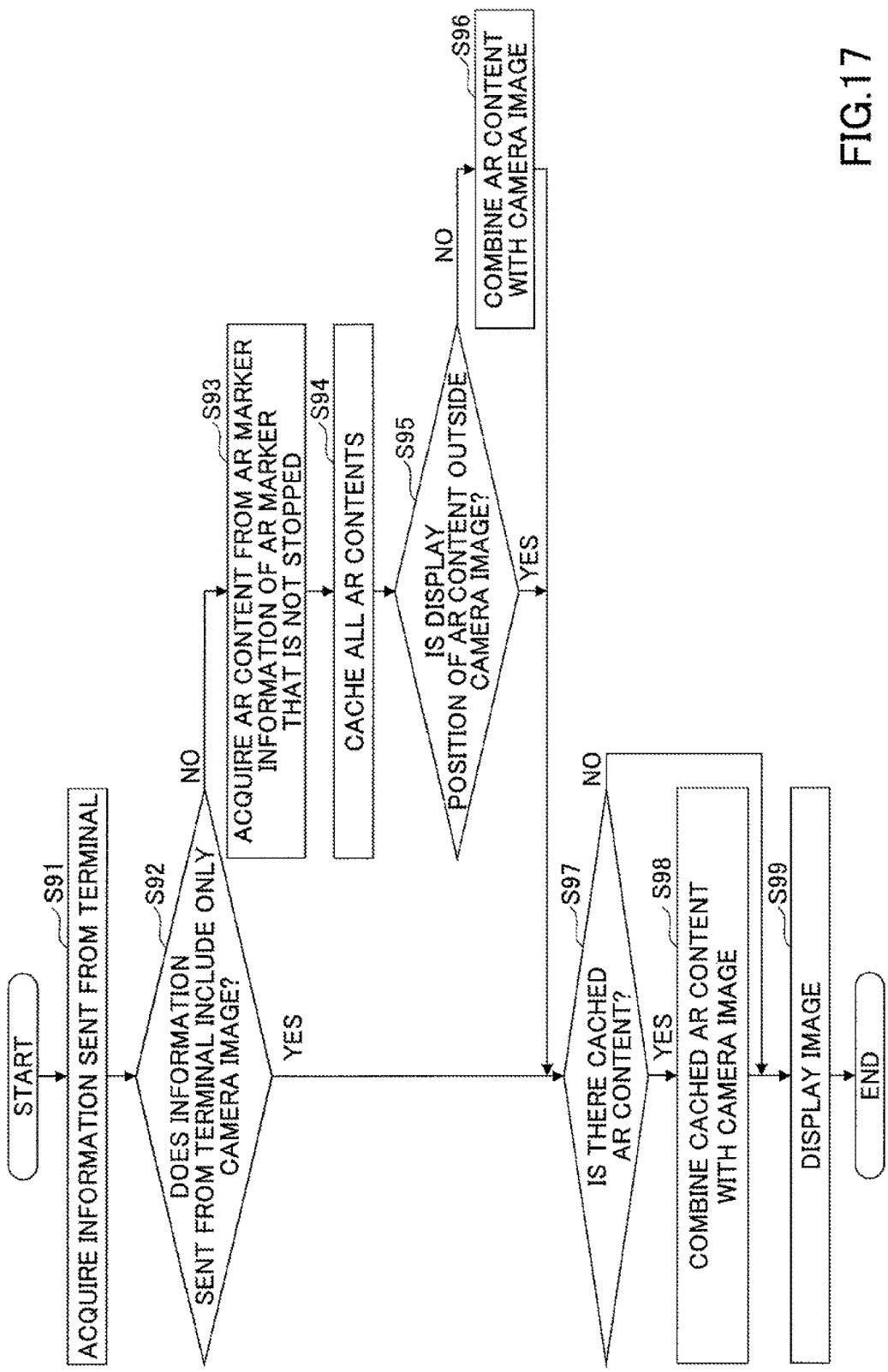
FIG. 17 is a flowchart of an example of a screen generating process by the server according to the fourth embodiment.

FIG. 17 is a flowchart of an example of a screen generating process by the server 12 according to the fourth embodiment. In the example of FIG. 17, in steps S91 through S93, the same processes as those of steps S11 through S13 of the first embodiment are performed, and therefore detailed descriptions of these steps are omitted. In the process of step S93, after the AR content is acquired from the AR marker information of the AR marker that is not stopped, all AR contents are stopped, and therefore all AR contents are cached (step S94). In the process of step S94, the position information of the AR contents is also cached.

Next, the combining unit 55 determines whether the display position of the acquired AR content is outside the camera image (step S95). When the display position is not outside the camera image (NO in step S95), the combining unit 55 combines the AR content with the camera image (step S96).

Furthermore, in the process of step S92, when the information sent from the terminal 11 only includes a camera image (YES in step S92), or in the process of step S95, the display position of the acquired AR content is outside the camera image (YES in step S95), or after the process of step S96, the server 12 determines whether there is any AR content cached in the storage unit 52, etc. (step S97). When there is AR content cached in the storage unit 52, etc. (YES in step S97), the combining unit 55 combines the cached AR content with the camera image (step S98). Furthermore, in the process of step S97, when there is no AR content cached in the storage unit 52, etc. (NO in step S97), or after the process of step S98, the server 12 displays the image on the display unit 53, etc. (step S99), and ends the process.

Note that in the fourth embodiment, all AR contents are stopped; however, the present embodiment is not so limited, and the image itself may be fixed. Furthermore, when releasing the fixed state, as in the third embodiment, by selecting a button for release, etc., the fixed display may be released.

As described above, according to the present embodiment, the processing load of the terminal is reduced. For example, when sharing the AR video with a remote supporter, even if the performance (spec) of the terminal displaying the AR content is not very high, it is possible to smoothly share a screen with the remote supporter.

For example, in the present embodiment, the terminal sends the AR marker information and the camera image to the server, and the server combines the AR content and the camera image, instead of combining the AR content and the camera image at the terminal. Therefore, the processing speed is increased. Furthermore, it is possible to prevent the process of combining AR content with the camera image when an AR marker is not detected, or when the AR content is outside the image. Furthermore, when the AR marker or the camera image is stopped (fixed), it is possible to use an image cached at the server 12.

The present invention is not limited to the specific embodiments described herein, and variations and modifications may be made without departing from the scope of the present invention. Furthermore, all of or some of the elements in the above embodiments may be combined.

According to an aspect of the embodiments, a terminal control method, an image generating method, and a terminal are provided, which are capable of reducing the processing load of a terminal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method executed by a system including a terminal and a remote information processing apparatus, the control method comprising:
   detecting, by the terminal, that an image of a reference object is included in a captured image;
   identifying, by the terminal, identification information that identifies the reference object or content associated with the reference object and position information that indicates a position of the reference object or the content in the captured image;
   sending, by the terminal, the identification information, the position information, and the captured image to the remote information processing apparatus that is configured to combine a content associated with received identification information, with a received captured image, based on received position information;
   caching, by the remote information processing apparatus, the content associated with identification information received from the terminal; and
   combining, by the remote information processing apparatus, a cached content and the captured image upon detecting first information that includes the captured image and does not include the identification information, the first information being received from the terminal.

2. The control method according to claim 1, further comprising:
   sending, by the terminal, the first information corresponding to accepting a fixing operation to the remote information processing apparatus, when the fixing operation to fix the position of displaying the content in a screen displaying the captured image, is accepted, the first information including the captured image.

3. The control method according to claim 2, wherein the fixing operation to fix the position of displaying the content is performed with respect to one or more of the reference objects or one or more of the contents displayed in the screen.

4. The control method according to claim 2, further comprising:
   sending, by the terminal, the second information corresponding to accepting a fix-releasing operation to the remote information processing apparatus, when the fix-releasing operation to release the fixed position of displaying the content in the screen displaying the captured image, is accepted; and
   deleting, the remote information processing apparatus, the cached content in response to receiving the second information.

5. An image generating method comprising:
   receiving a captured image, identification information that identifies the reference object or content associated with the reference object, and position information that indicates a position of the reference object or the content in the captured image, sent from a terminal, the identification and the position information being identified at the terminal;
   acquiring content corresponding to the received identification information;
   generating an image in which the acquired content is combined with the captured image;
   caching the content associated with identification information received from the terminal; and
   combining a cached content and the captured image upon detecting information that includes the captured image and does not include the identification information, the information being received from the terminal.

6. The image generating method according to claim 5, wherein the image in which the acquired content is combined with the captured image is not generated, when the identification information and the position information are not sent from the terminal, or when the content corresponding to the identification is not positioned in the captured image.

7. The image generating method according to claim 5, further comprising:
   combining the content generated in a screen before a fixing operation is performed, with the captured image acquired after the fixing operation is performed, when the fixing operation to fix a position of displaying the content is performed at the terminal.

8. A system comprising:
   a terminal and;
   a remote information processing apparatus,
   wherein the terminal includes
   a first memory, and
   a first processor coupled to the first memory, and the first processor configured to:
      detect that an image of a reference object is included in a captured image;
      identify identification information that identifies the reference object or content associated with the reference object and position information that indicates a position of the reference object or the content in the captured image; and
      send the identification information, the position information, and the captured image to a remote information processing apparatus that is configured to combine a content associated with received identification information, with a received captured image, based on received position information, and wherein the remote information processing apparatus includes a second memory, and a second processor coupled to the second memory, and the second processor configured to:

cache the content associated with identification information received from the terminal; and combine a cached content and the captured image upon detecting information that includes the captured image and does not include the identification information, the information being received from the terminal.

* * * * *